(12) United States Patent
Lee et al.

(10) Patent No.: US 9,389,079 B2
(45) Date of Patent: Jul. 12, 2016

(54) OPTOMECHANICAL DISK VIBRATORY GYROSCOPES

(71) Applicants: Jonathan Y. Lee, Rochester, NY (US); Qiang Lin, Rochester, NY (US); Oskar J. Painter, Sierra Madre, CA (US)

(72) Inventors: Jonathan Y. Lee, Rochester, NY (US); Qiang Lin, Rochester, NY (US); Oskar J. Painter, Sierra Madre, CA (US)

(73) Assignees: University of Rochester, Rochester, NY (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/627,485

(22) Filed: Feb. 20, 2015

(65) Prior Publication Data

US 2016/0069686 A1 Mar. 10, 2016

Related U.S. Application Data

(60) Provisional application No. 61/943,020, filed on Feb. 21, 2014.

(51) Int. Cl.
*G01C 19/72* (2006.01)
*G01C 19/66* (2006.01)

(52) U.S. Cl.
CPC .................... *G01C 19/661* (2013.01)

(58) Field of Classification Search
CPC .... G01C 19/72; G01C 19/721; G01C 19/722; G01P 3/363; G01B 9/02
USPC ......................................... 356/460
See application file for complete search history.

(56) References Cited

U.S. PATENT DOCUMENTS

| 8,867,026 B2* | 10/2014 | Wong ..................... G01V 7/005 356/35.5 |
| 2013/0042680 A1* | 2/2013 | Wong ..................... G01V 7/005 73/382 R |
| 2014/0060178 A1* | 3/2014 | Wong ..................... G01V 7/005 73/382 G |
| 2014/0313559 A1* | 10/2014 | Lipson ............... G02B 6/29338 359/238 |

OTHER PUBLICATIONS

Yazdi, Navid, et al., "Micromachined Inertial Sensors", Aug. 1988, Proceedings of the IEEE, vol. 86, No. 8, pp. 1640-1659 (20 pages).
Macek, W. M., et al., "Rotation Rate Sensing With Traveling-Wave Ring Lasers", 1963, Applied Physics Letters 2, p. 67. (3 pages).
Lefevre, Herve C., et al. "Fiber-Optic Gyroscope", 1992, North Atlantic Treaty Organization, p. 8. (6 pages).

(Continued)

*Primary Examiner* — Tarifur Chowdhury
*Assistant Examiner* — Md M Rahman
(74) *Attorney, Agent, or Firm* — Harris Beach PLLC

(57) ABSTRACT

An integrated optomechanical disk vibratory gyroscope device includes a mechanical oscillator having a substantially circular structure. The substantially circular structure is supported by a pillar, and mechanically isolated from a surrounding structure by a gap or slot. One or more actuators are coupled to the mechanical oscillator across the gap or slot. Each of the one or more actuators is configured to excite the mechanical oscillator in a driving mode. One or more optomechanical cavities are disposed substantially in a plane defined by the mechanical oscillator. At least one component of the one or more optomechanical cavities is disposed on or in the substantially circular structure. Each of the at least one or more optomechanical cavities configured to measure a displacement of the mechanical oscillator in a sensing mode. A method of manufacture is also described.

17 Claims, 25 Drawing Sheets

(56) References Cited

OTHER PUBLICATIONS

Bernstein, J., et al., "A Micromachined Comb-Drive Tuning Fork Rate Gyroscope", 1993, IEEE, pp. 143-148.

Sharma, Ajit, et al., "A 104-dB Dynamic Range Transimpedance-Based CMOS ASIC for Tuning Fork Microgyroscopes", 2007, IEEE Journal of Solid-State Circuits, vol. 42, No. 8, pp. 1790-1802. (13 pages).

Wang, Ren, et al., "A multiple-beam tuning-fork gyroscope with high quality factors", 2011, Sensors and Actuators A: Physical, 166, pp. 22-33 (12 pages).

Maenaka, K., et al., "A study of silicon angular rate sensors using anisotropic etching technology", 1994, Sensors and Actuators A, 43, pp. 72-77 (6 pages).

Meyer, A.D., et al. "milli-HRG Inertial Navigation System", 2012, IEEE, pp. 24-29 (6 pages).

Kagawa, Yukio, et al., "A Tubular Piezoelectric Vibrator Gyroscope", Apr. 2006, IEEE Sensors Journal, vol. 6, No. 2, pp. 325-330 (6 pages).

Tang, William C., et al., Electrostatic-comb Drive of Lateral Polysilicon Resonators, 1990, Sensors and Actuators, A21-A23, pp. 328-331 (4 pages).

Camacho, Ryan M., et al., "Characterization of radiation pressure and thermal effects in a nanoscale optomechanical cavity", Aug. 31, 2009, Optics Express, vol. 17, No. 18, pp. 15726-15735 (10 pages).

Krause, Alexander G., et al., "A high-resolution microchip optomechanical accelerometer", Nov. 2012, Nature Photonics, vol. 6, pp. 768-772 (5 pages).

Teufel, J. D., et al., "Nanomechanical motion measured with an imprecision below that at the standard quantum limit", Dec. 2009, Nature Nanotechnology, vol. 4, pp. 820-823 (4 pages).

Anetsberger, G., et al., "Measuring nanomechanical motion with an imprecision below the standard quantum limit", 2010, Physical Review A 82, 061804(R). (4 pages).

Sheard, Benjamin S., et al., "Observation and characterization of an optical spring", 2004, Physical Review A 69, p. 051801(R). (4 pages).

Lin, Qiang, et al., "Mechanical Oscillation and Cooling Actuated by the Optical Gradient Force", 2009, Physical Review Letters vol. 103, p. 1030601. (4 pages).

Sharma, Ajit, et al., "A Sub-02°/hr Bias Drift Micromechanical Silicon Gyroscope With Automatic CMOS Mode-Matching," 2009, IEEE Journal of Solid-State Circuits, vol. 44, No. 5, pp. 1593-1608 (16 pages).

Yamamoto, Takayuki, et al., Design of a high-Q air-slot cavity based on a width-modulated line-defect in a photonic crystal slab, Sep. 1, 2008, Optics Express, vol. 16, No. 18, pp. 13809-13817 (9 pages).

Pai, Pradeep, et al., "Fabrication and Testing of Hemispherical MEMS Wineglass Resonators", Jan. 20-24, 2013, MEMS vol. 13, pp. 677-680 (4 pages).

\* cited by examiner

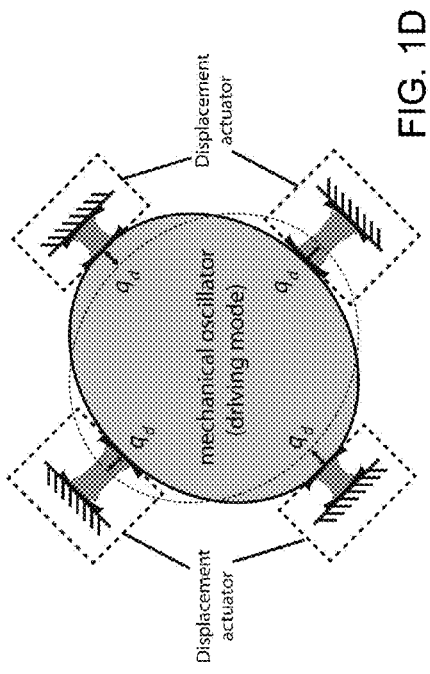
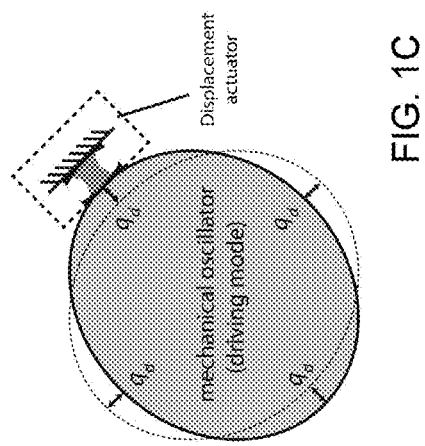
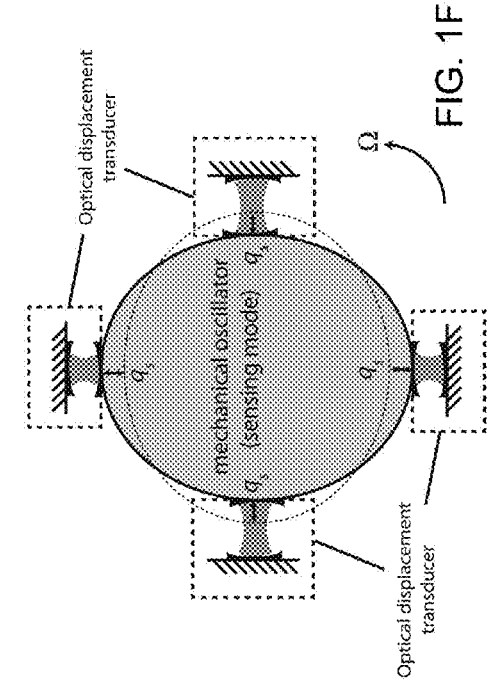
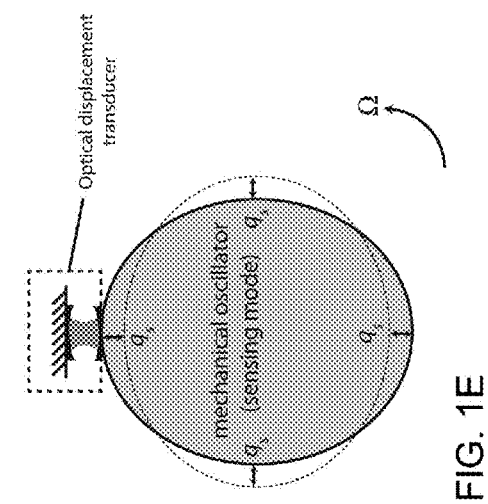
FIG. 1C
FIG. 1D
FIG. 1E
FIG. 1F

TABLE I: Mechanical parameters of the gyroscope with the hat structure

| Parameter | | Value | |
|---|---|---|---|
| Device disk radius | $R$ | 100 | $\mu$m |
| Device layer thickness | $th$ | 400 | nm |
| Hat disk radius | $R_{hat}$ | 80 | $\mu$m |
| Hat layer thickness | $th_{hat}$ | 3 | $\mu$m |
| Mechanical mode number | $m$ | 2 | |
| Coriolis coupling coefficient | $\gamma$ | 0.90 | |
| Effective mass | $m_{s,d}$ | $1.04 \times 10^{-10}$ | kg |
| Resonant frequency | $f_{s,d}$ | 20.1 | MHz |
| Quality factor | $Q_{s,d}$ | $10^5$ | |
| Drive displacement | $q_d$ | 100 | nm |

FIG. 15

TABLE II: Optomechanical parameters of the photonic-crystal cavity.

| Parameter | | Value | |
|---|---|---|---|
| Optomechanical coupling constant | $g_{OM}$ | $2\pi \times 100$ | GHz/nm |
| Optical resonant frequency | $f_O$ | 200 | THz |
| Optical quality factor | $Q_O$ | $10^4$ | |
| Optical input power | $P_{in}$ | 100 | $\mu$W |
| Transmission from cavity to detector | $\eta_{in}$ | 0.57 | |
| Transmission dip | $T_d$ | 0.87 | |
| Noise-equivalent-power of the detector | $NEP$ | 2.8 | $pW/\sqrt{Hz}$ |

FIG. 16

OPTOMECHANICAL DISK VIBRATORY GYROSCOPES

CROSS-REFERENCE TO RELATED APPLICATIONS

This application claims priority to and the benefit of co-pending U.S. provisional patent application Ser. No. 61/943,020, OPTOMECHANICAL DISK VIBRATORY GYROSCOPES, filed Feb. 21, 2014, which application is incorporated herein by reference in its entirety.

STATEMENT REGARDING FEDERALLY FUNDED RESEARCH OR DEVELOPMENT

This invention was made with government support under grant no. W911NF-11-1-0173 awarded by the DARPA QuASaR program. The government has certain rights in the invention.

FIELD OF THE APPLICATION

The invention relates to an integrated gyroscope and more particularly to an integrated vibratory gyroscope.

BACKGROUND

In the background, other than the bolded paragraph numbers, non-bolded square brackets ("[ ]") refer to the citations listed hereinbelow.

Chip-scale gyroscopes have been used for inertial navigation to detect angular velocity in consumer electronics and automobiles.[1] Gyroscopes are commonly based on two different principles: the Sagnac effect which is based on inertial property of light, and the Coriolis effect which is based on the conservation of angular momentum.

Optical ring laser gyroscopes (RLG) and fiber-optic gyroscopes (FOG) have been demonstrated by coupling light into a Sagnac interferometer, which requires a relatively large optical cavity.[2,3] Mechanical vibratory gyroscopes are based on Coriolis effect and have a relatively small footprint. Vibratory gyroscopes typically use a small driven mechanical oscillator (e.g. tuning fork [4-6], vibrating beam [7] and vibrating shell [8-10]).

SUMMARY

According to one aspect, an integrated optomechanical disk vibratory gyroscope device includes a mechanical oscillator which includes a substantially circular structure. The substantially circular structure is mechanically coupled to and supported by a pillar, and mechanically isolated from a surrounding structure by a gap or slot. One or more actuators are disposed in the surrounding structure adjacent to and electro-mechanically or opto-mechanically coupled to the mechanical oscillator across the gap or slot. Each of the one or more actuators is configured to excite the mechanical oscillator in a driving mode. One or more optomechanical cavities are disposed substantially in a plane defined by the mechanical oscillator and radially offset about the substantially circular structure from the one or more actuators. At least one component of the one or more optomechanical cavities is disposed on or in the substantially circular structure. Each of the at least one or more optomechanical cavities is configured to measure a displacement of the mechanical oscillator in a sensing mode.

In one embodiment, the mechanical oscillator includes a disk structure.

In another embodiment, the mechanical oscillator includes a ring or wheel structure.

In yet another embodiment, the mechanical oscillator includes a hat structure.

In yet another embodiment, the mechanical oscillator includes a mushroom or wine-glass structure.

In yet another embodiment, the one or more actuators include electrical driving electrodes.

In yet another embodiment, the one or more actuators include optical displacement actuators.

In yet another embodiment, at least one of the one or more optomechanical cavities includes a slotted photonic-crystal cavity, a first side of each of the slotted photonic-crystal cavities mechanically coupled to the mechanical oscillator, and a second side of each of the slotted photonic-crystal cavities mechanically grounded.

In yet another embodiment, at least one of the one or more optomechanical cavities includes a coupled photonic-crystal nanobeam, a first beam of the coupled photonic-crystal nanobeam mechanically coupled to the mechanical oscillator, and a second beam of beam of the coupled photonic-crystal nanobeam mechanically grounded.

In yet another embodiment, at least one of the one or more optomechanical cavities further includes optical strip waveguides, each of the optical strip waveguides including a bend configured to route optical signals to and from the integrated optomechanical disk vibratory gyroscope.

In yet another embodiment, at least one of the one or more optomechanical cavities includes a Fabry-Perot optomechanical cavity having a first mirror coupled to the mechanical oscillator, and a second mirror mechanically grounded.

In yet another embodiment, one or more optical strip waveguides are butt coupled to a short photonic-crystal waveguide.

In yet another embodiment, the integrated optomechanical disk vibratory gyroscope device further includes a grating coupler or a mode-converter configured to couple light to or from an off-chip optical fiber.

In yet another embodiment, at least a selected one of: a frequency of the one or more optomechanical cavities, and a bandwidth of the one or more optomechanical cavities is tuned by use of an optical spring effect.

In yet another embodiment, a method for operating an integrated optomechanical disk vibratory gyroscope device includes the steps of: providing an integrated optomechanical disk vibratory gyroscope device as described hereinabove; displacing the mechanical oscillator by an electromechanical or optomechanical stimulus applied to a displacement actuator including the one or more actuators; and sensing a displacement of the mechanical oscillator responsive by a plurality of displacement sensors including the one or more optomechanical cavities.

In one embodiment, the step of displacing the mechanical oscillator includes displacing the mechanical oscillator by an electromechanical stimulus applied by capacitively coupled electrodes driven by an electrical potential.

In another embodiment, the step of displacing the mechanical oscillator includes displacing the mechanical oscillator by an optomechanical stimulus applied to the displacement actuator including the one or more actuators wherein an optical gradient force is generated by pumping the optomechanical cavity with an optical wave and the mechanical oscillator is driven by modulating a pump amplitude at a mechanical resonance frequency.

According to another aspect, a method for fabricating an integrated optomechanical disk vibratory gyroscope device including the steps of: providing a substrate; depositing a thin-film device layer on the substrate; patterning the device layer to create a circumferential slot around a substantially circular structure of a mechanical oscillator; and undercutting the substrate to create a circumferential void and pillar to support the substantially circular structure of the mechanical oscillator.

In one embodiment, the method further includes, after the step of depositing a thin-film device layer on the substrate, the step of depositing a thick hat layer over the thin-film device layer and a step of patterning the thick hat layer to create a thick disk.

According to yet another aspect, a method for fabricating a mushroom or wine-glass structure integrated optomechanical disk vibratory gyroscope device including the steps of: providing a substrate; depositing a thick sacrificial layer on the substrate; etching the thick sacrificial layer to form a mold; depositing a thin-film device layer on the mold; and removing the mold by wet etching to create voids and the mushroom or wine-glass structure.

The foregoing and other objects, aspects, features, and advantages of the invention will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1C shows a block diagram illustrating the driving mechanical mode of operation of an exemplary vibratory gyroscope having a single displacement sensor;

FIG. 1D shows a block diagram illustrating the sensing mechanical mode of operation of the exemplary vibratory gyroscope of FIG. 1C;

FIG. 1E shows a block diagram illustrating the driving mechanical mode of operation of an exemplary vibratory gyroscope having four displacement sensors;

FIG. 1F shows a block diagram illustrating the sensing mechanical mode of operation of the exemplary vibratory gyroscope of FIG. 1E;

FIG. 15 shows a table (Table 1) of exemplary mechanical parameters of a gyroscope with the hat structure; and FIG. 16 shows a table (Table 2) of exemplary optomechanical parameters of a photonic-crystal cavity;

DETAILED DESCRIPTION

In the description, other than the bolded paragraph numbers, non-bolded square brackets ("[ ]") refer to the citations listed hereinbelow.

With recent developments in microelectromechanical system (MEMS), vibratory gyroscopes at the chip-scale are suitable for portable device applications where both endurance and shock-resistance can be important. In MEMS, the readout of mechanical motion is usually carried out by piezoelectric [11] or capacitive [12] transducers. However, electronic interface circuitry adds electrical thermal noise and picks up electromagnetic interference. Recently, a micromechanical accelerometer has been demonstrated with high-resolution optical readout by using an optomechanical cavity [14]. The high sensing resolution benefits from the strong coupling between the photon and the phonon from the cavity-optomechanical effect. An optomechanical cavity enables sensitive optical readout of the mechanical motion with an imprecision that is below the standard quantum limit [15, 16]. Moreover, with optical spring effect [17, 18], the spring's stiffness can be optically tuned in order to compensate for the mismatch of mechanical frequency due to fabrication imperfections. Such tuning can be important in a vibratory gyroscope, because frequency matching can improve both gyroscope resolution and sensitivity. [19]

Vibratory gyroscopes generally support at least two orthogonal vibrating mechanical modes. The driving mode is initially excited. The rotation motion generates Coriolis forces that transfer energy to the sensing mode. The vibrating mass can be constructed in different geometries such as, for example, a tuning fork, a rectangular block, a disk, or a hemisphere.

By contrast with a vibratory gyroscope where a disk structure acts as both an optical ring resonator and a mechanical disk resonator, it was realized that improved performance can be achieved by a new optomechanical disk vibratory gyroscope structure having a mechanical disk structure with one or more attached optomechanical cavities. Moreover, it was realized that one component of the one or more attached optomechanical cavities can be placed in or on the mechanical disk resonator while another component of the one optomechanical cavity can be mechanically grounded.

Optomechanical Disk Vibratory Gyroscope

Figure 1A:
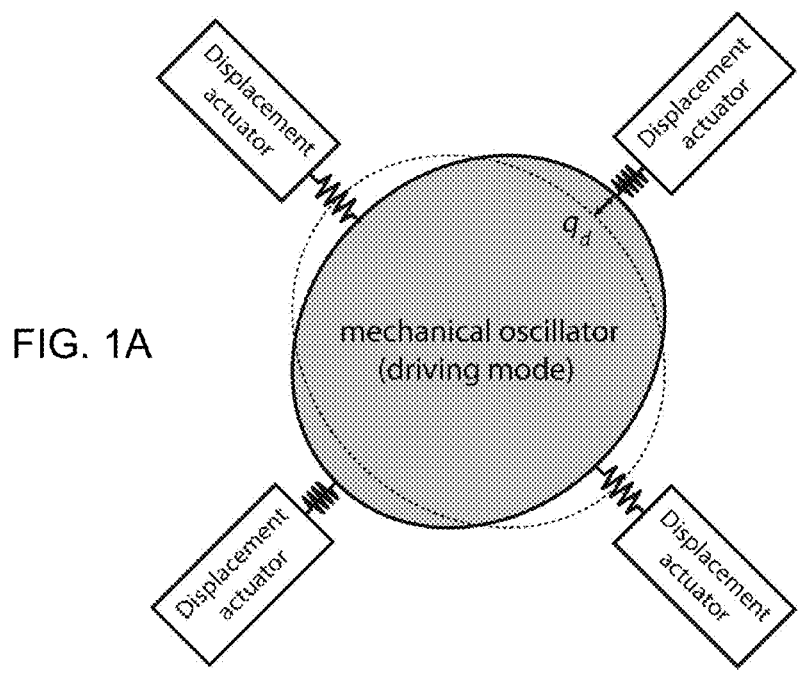
FIG. 1A shows a block diagram illustrating the driving mechanical mode of operation of an exemplary vibratory gyroscope.
Figure 1B:
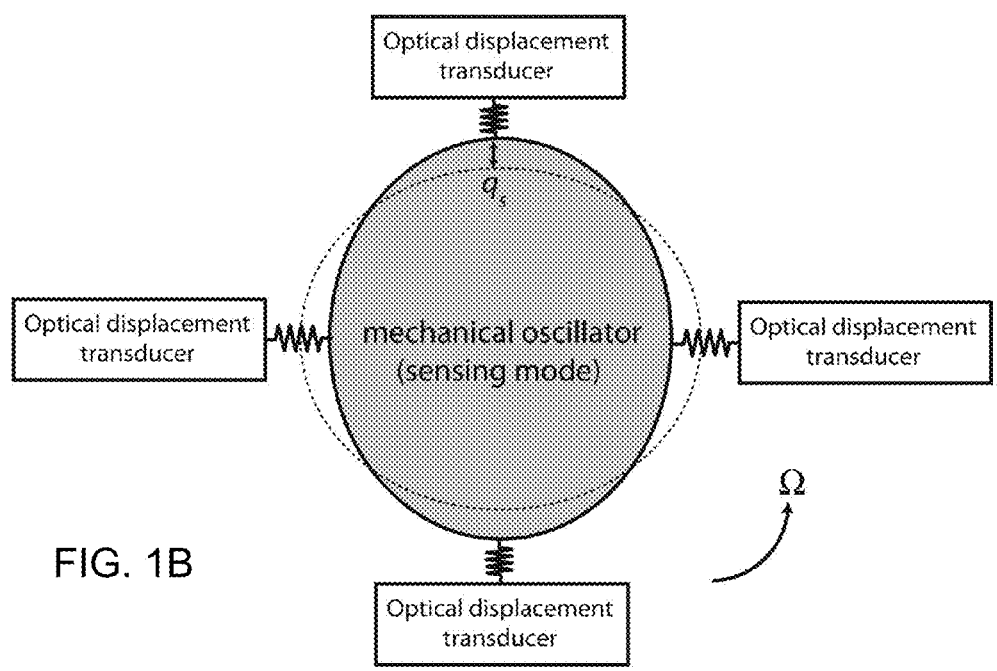
FIG. 1B shows a block diagram illustrating the sensing mechanical mode of operation of the exemplary vibratory gyroscope of FIG. 1A.

Principal of operation: FIG. 1A and FIG. 1B show the principal of operation of an exemplary optomechanical disk vibratory gyroscope based on a circular structure (e.g., a disk, ring or wineglass) which supports two orthogonal mechanical breathing modes. The "breathing mode" is a standing wave which is a superposition of the clockwise and the anticlockwise propagating acoustic waves. Typically, second order breathing modes are used, which have 4 antinodes and 4 nodes. The two degenerate modes are rotated by 45° with respect to each other. FIG. 1A shows the driving mechanical mode. The mechanical oscillator is driven by a displacement actuator, such as, for example, an optomechanical cavity or an electrical capacitor. FIG. 1B shows the sensing mechanical mode. The optical displacement sensor can be an optomechanical cavity. The axis of the rotation ($\Omega$) is out-of-plane. Rotational symmetric structures such as a disk and a hemisphere can support two degenerate mechanical breathing modes. An exemplary disk structure has been used for illustration in FIG. 1A and FIG. 1B, without the loss of generality.

Continuing with the exemplary embodiment of FIG. 1A, the driving mode is excited by a displacement amplitude of $q_d$ in radical direction. The oscillator can be driven, for example, by optical displacement actuators (using optomechanical cavities) or by electrical displacement actuators (e.g. using electrical capacitive electrodes). When the rotation ($\Omega$) is applied, energy is transferred from the driving mode to the sensing mode by the Coriolis forces. The displacement of the sensing mode $q_s$ can be measured by use of optomechanical cavities. The displacement sensors are typically placed at the 45° positions (radially offset about a substantially circular structure from the one or more actuators) with respect to the displacement actuators such that the displacement sensors do not sense the motion of the driving mode. Use of an optical readout eliminates most of the electrical circuitry of prior art mechanical gyros. Moreover, cavity optomechanics enables strong coupling between the photon and phonon which provides an optical probe sensitive to the small mechanical motion. This design reduces the readout noise and thus increases the resolution of the gyroscope.

Figure 4A:
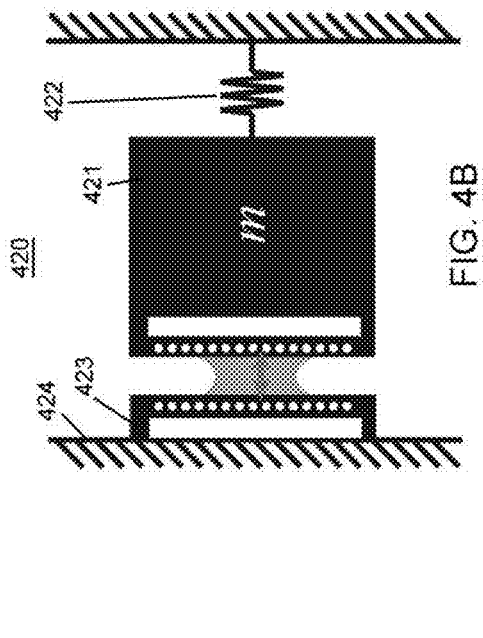
FIG. 4A shows an illustration of an exemplary Fabry-Perot cavity suitable for use in an optomechanical disk vibratory gyroscope.
Figure 4B:
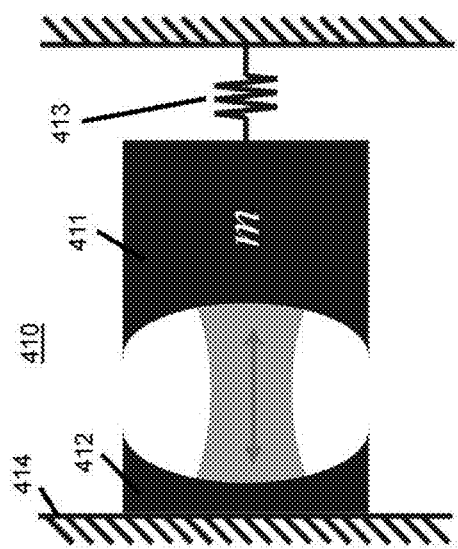
FIG. 4B shows an illustration of an exemplary slotted photonic-crystal nanobeam suitable for use in an optomechanical disk vibratory gyroscope.
Figure 4C:
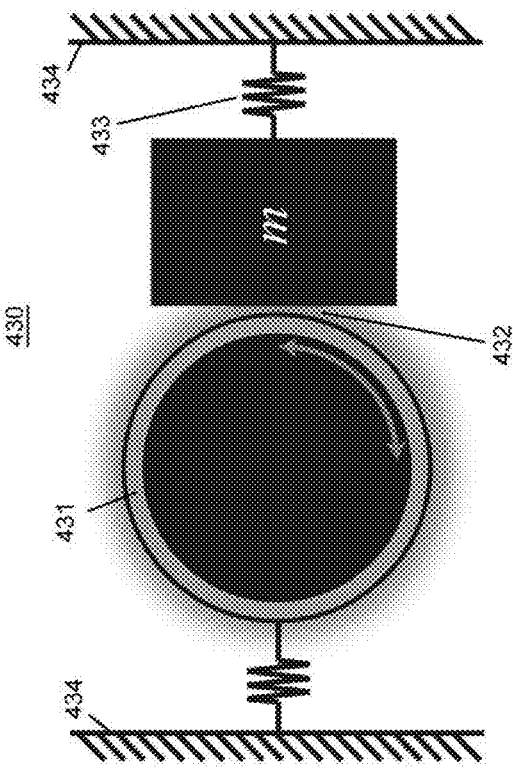
FIG. 4C shows an illustration of an exemplary whispering-gallery-mode (WGM) optical cavity suitable for use in an optomechanical disk vibratory gyroscope.

Turning now to FIG. 1C, FIG. 1D, FIG. 1E, and FIG. 1F, and continuing with the principal of vibratory gyroscope based on circular structures (for example, disk, ring and wineglass) two mechanical breathing modes are supported. The two degenerate modes are typically rotated by 45 with respect to each other. Exemplary schematics of the driving mechanical mode excited electro-mechanically or opto-mechanically, for example, in one embodiment by one displacement actuator (FIG. 1C), or in other embodiments, four displacement actuators (FIG. 1D) which can be positioned at the one or more locations with maximum displacement. Exemplary schematics show the sensing mechanical mode measured optomechanically by, for example, one optical displacement transducer (FIG. 1E), or by four optical displacement transducers (FIG. 1F) positioned at the locations with maximum displacement. In the exemplary embodiments of FIG. 1C, FIG. 1D, FIG. 1E, and FIG. 1F, Fabry-Perot optomechanical cavities are shown used both as displacement actuators and optical displacement transducers. Other optomechanical cavities examples are shown in FIG. 4A, FIG. 4B, and FIG. 4C, where the axis of the rotation can be out-of-plane.

Figure 1G:
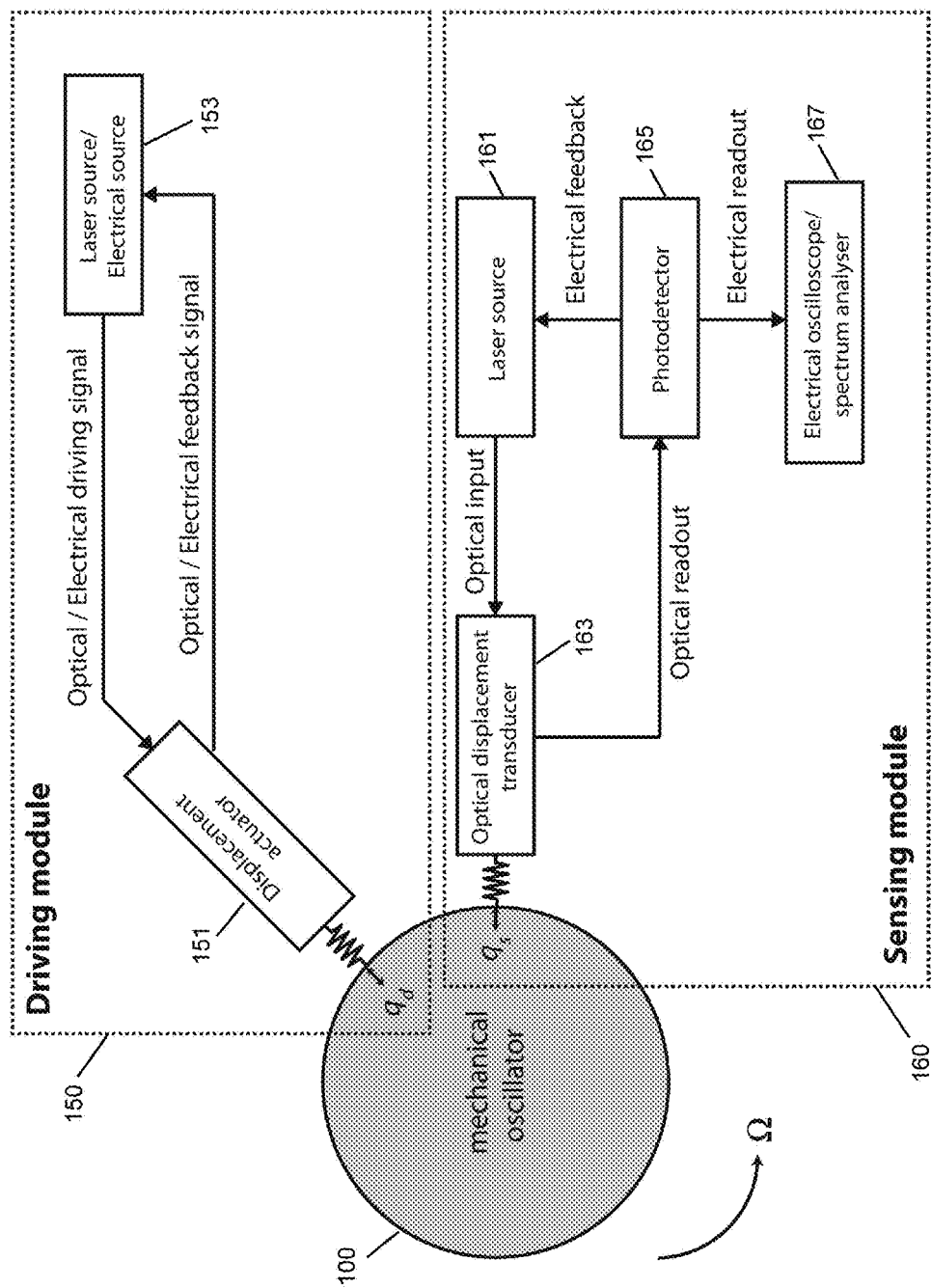
FIG. 1G shows a block diagram illustrating an exemplary setup for exciting the driving mechanical mode and measuring the sensing mechanical mode of the vibratory gyroscope of FIG. 1A and FIG. 1B.

Operation setup: FIG. 1G shows one exemplary setup to operate a optomechanical vibratory gyroscope 100 as described herein. The setup includes a driving module 150 and a sensing module 160. The driving module controls one or more displacement actuators 151. An electrical source or laser source 153 can be used to drive the displacement actuator 151 as follows: If the displacement actuator is an electrical capacitor actuator, an electrical source can be connected to the electrical capacitor actuator and a feedback control loop can be implemented to maintain a stable mechanical oscillation such that the driving displacement amplitude $q_d$ is constant. If the displacement actuator is an optomechanical actuator, an intense modulated optical waves from a laser source can be pumped into the optomechanical cavities. A feedback loop is required to lock the laser power for maintaining a constant driving amplitude $q_d$. The sensing module 160 provide a readout of the rotation information. A continuous wave from a laser source 161 is coupled into one or more optomechanical cavities (optical displacement transducer 163). The displacement of the sensing mode $q_s$ modulates the amplitude of the optical wave. That is, the rotation information is imprinted into the optical transmission. The optical transmission signal is converted into electrical signal using a photodetector 165. The electrical output is feed back to the laser to lock the optical power. For purposes of the operational test setup, the rotation (Ω) can be measured by use of commercially available laboratory test equipment 167, such as, for example, any suitable oscilloscope or electrical spectrum analyzer.

Figure 2C:
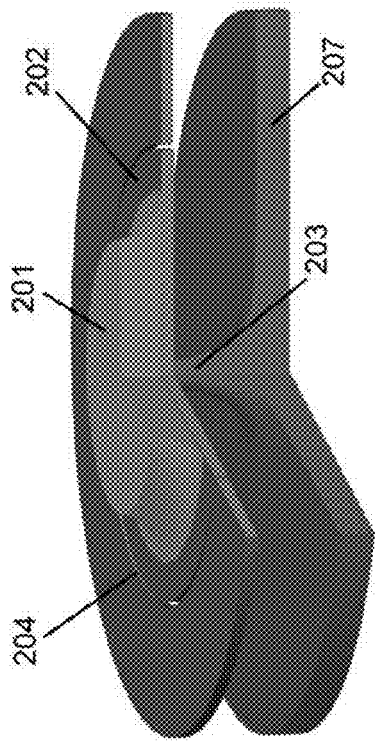
FIG. 2C shows a cutaway drawing of an exemplary circular-geometry hat structure optomechanical vibratory gyroscope.
Figure 2D:
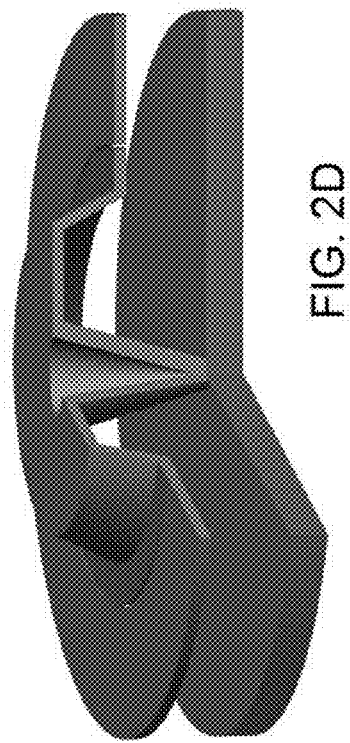
FIG. 2D shows a cutaway drawing of an exemplary circular-geometry mushroom/wine-glass structure optomechanical vibratory gyroscope.
Figure 2A:
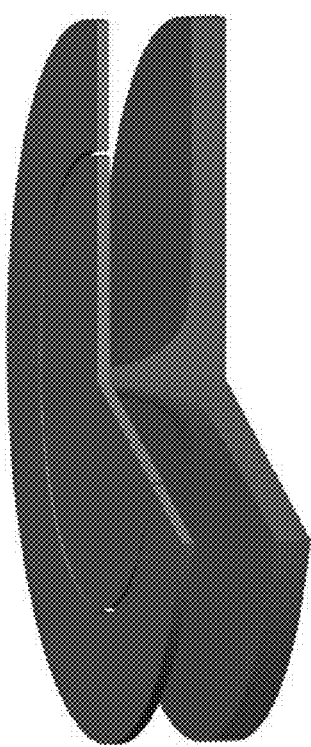
FIG. 2A shows a cutaway drawing of an exemplary circular-geometry disk structure optomechanical vibratory gyroscope.
Figure 2B:
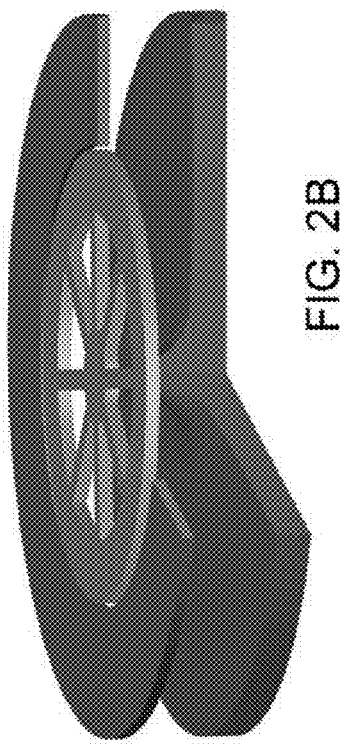
FIG. 2B shows a cutaway drawing of an exemplary circular-geometry ring/wheel structure optomechanical vibratory gyroscope.

Structure: FIG. 2A, FIG. 2B, FIG. 2C, and FIG. 2D show exemplary embodiments of a circular-geometry oscillator for optomechanical vibratory gyroscope. FIG. 2A shows a cutaway drawing of an exemplary circular-geometry disk structure optomechanical vibratory gyroscope. FIG. 2B shows a cutaway drawing of an exemplary circular-geometry ring/wheel structure optomechanical vibratory gyroscope. Both structures can be patterned on a thin-film layer. As shown in the exemplary embodiments, the substrate can be undercut so that the disk/ring is supported by a pillar. FIG. 2C shows a cutaway drawing of another exemplary circular-geometry hat structure optomechanical vibratory gyroscope. The exemplary FIG. 2C shows a hat structure with a thick disk 201 deposited on top of the thin-film disk 202 supported by a pillar 203, protruding from undercut substrate 207, and isolated by gap 204. The thick layer of disk hat structure, thick disk 201, creates a rigid body which provides a relatively large spring constant ($k = \omega_m^2 m_{eff}$). The large spring constant reduces the mechanical thermal noise (as shown in the Eq. 8 in the calculation section described hereinbelow). FIG. 2D shows a mushroom structure, also referred to herein interchangeably as an upside-down wineglass structure. The mushroom design reduces mechanical damping, thus increasing the mechanical quality factor.

The disk can support two orthogonal mechanical modes as described hereinabove, a driving mode and a sensing mode. Owing to the symmetry of the mechanical driving/sensing mode, in some embodiments, there are four antinodes in the breathing oscillation mode. Four actuators are disposed in the surrounding structure adjacent to the mechanical oscillator or across the gap or slot. The actuators excite the driving mode either electro-mechanically, such as by electrodes or opto-mechanically using optomechanical cavities. Four optical transducers (e.g. optomechanical cavities) are disposed substantially in a plane and orthogonal to the position of the actuators. Each of the four optical transducers are configured to measure a displacement of the rotation induced sensing mode.

Figure 3A:
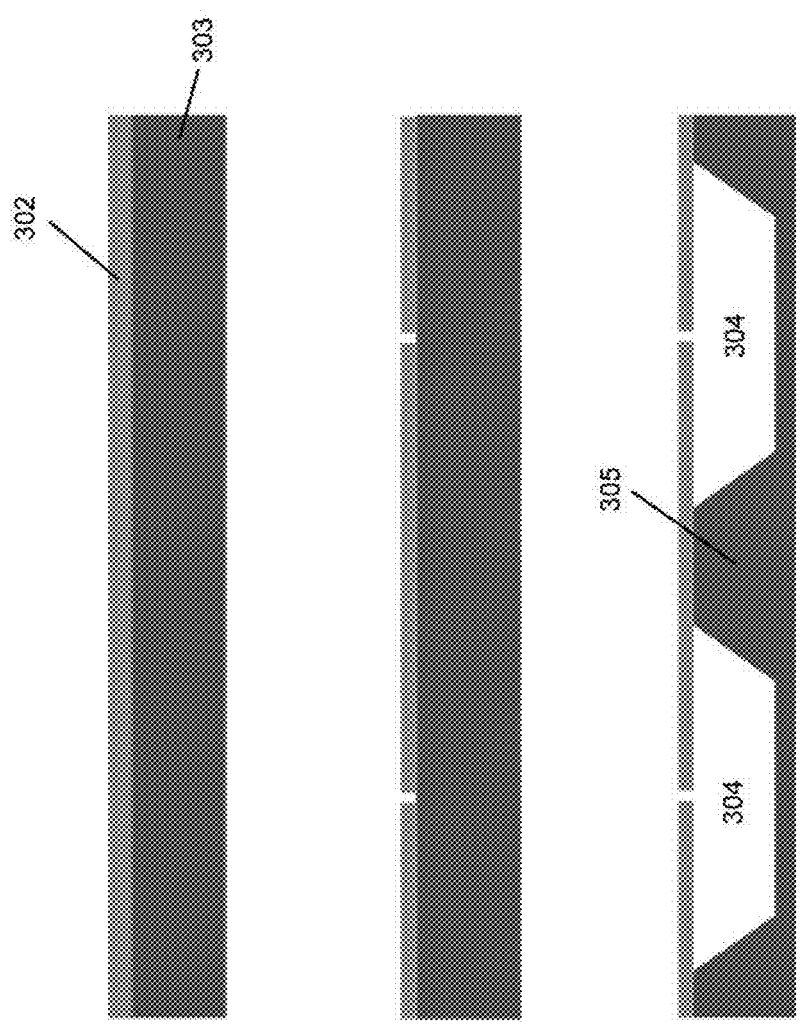
FIG. 3A illustrates a fabrication process for a disk/ring structure optomechanical vibratory gyroscope.
Figure 3B:
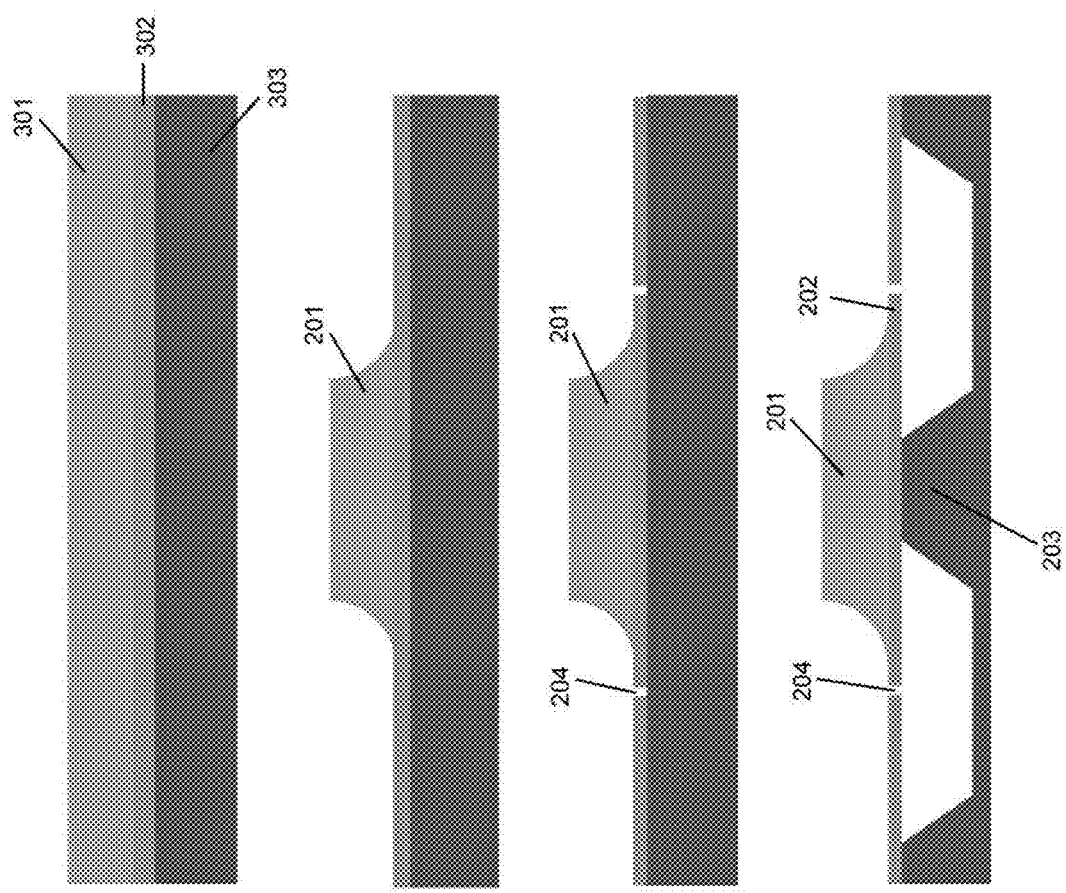
FIG. 3B illustrates a fabrication process for a hat structure optomechanical vibratory gyroscope.
Figure 3C:
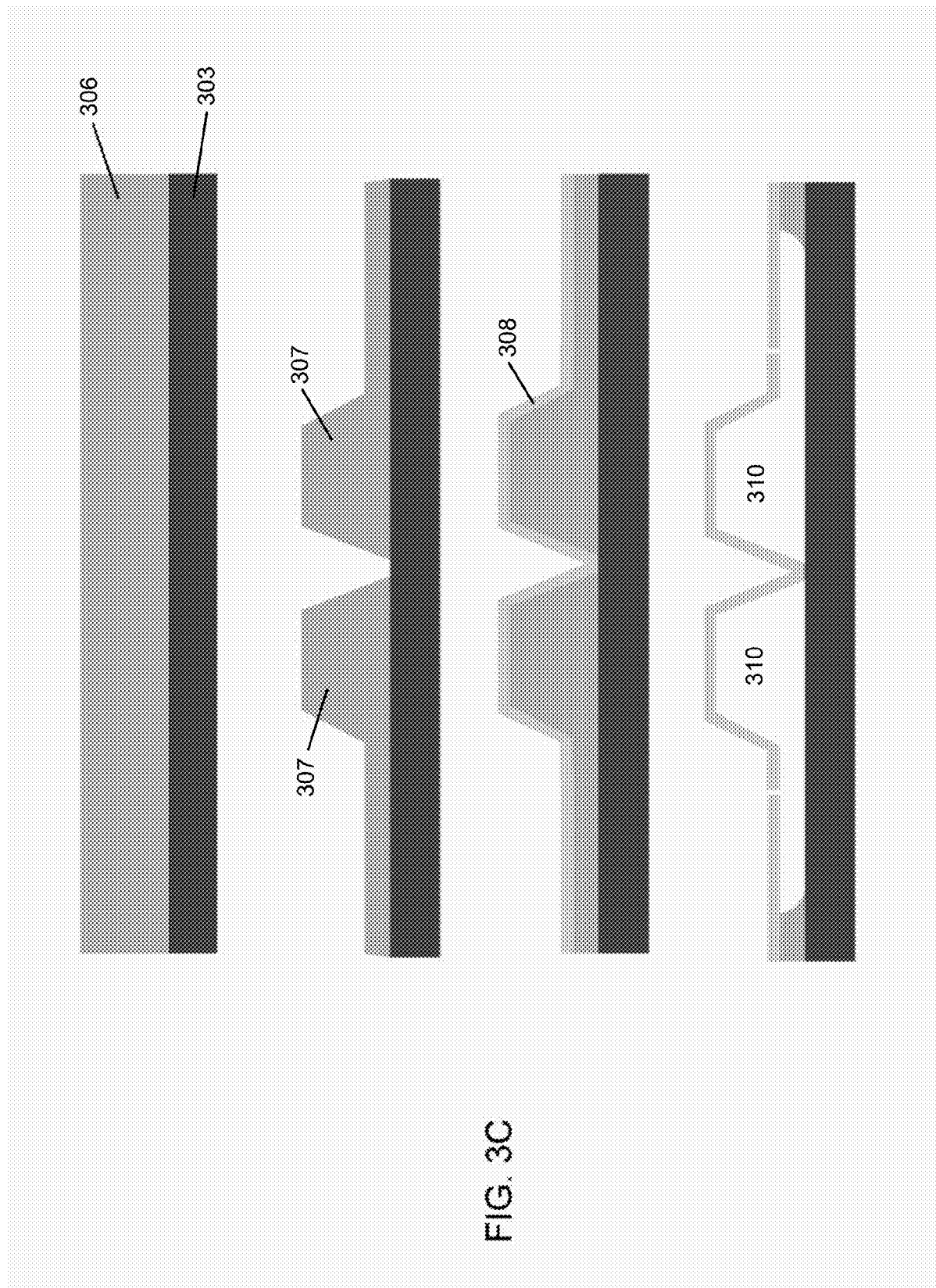
FIG. 3C illustrates a fabrication process for a mushroom structure optomechanical vibratory gyroscope.

Fabrication: Fabrication Process: FIG. 3A, FIG. 3B, and FIG. 3C show the fabrication process of the circular oscillator (for example, as shown in FIG. 2A, FIG. 2B, FIG. 2C, and FIG. 2D) for an optomechanical vibratory gyroscope. FIG. 3A illustrates a fabrication process for a disk/ring structure optomechanical vibratory gyroscope. FIG. 3A shows the fabrication process of the disk/ring. The thin-film device layer 302 is first deposited on the substrate 303. After the device layer is patterned, the substrate is undercut to create voids 304, and forms a pillar 305 at the center. FIG. 3B illustrates a fabrication process for a hat structure optomechanical vibratory gyroscope. FIG. 3B shows the fabrication process of the hat structure. A thick hat layer 301 is deposited on top of the thin-film device layer 302 with substrate 303 at the bottom. Next, the hat layer is patterned to form the thick disk 201. After the thin-film device layer is patterned to form the gap 204, the device is released by etching the substrate. Same as the disk/ring, the pillar 203 is formed to support the mechanical oscillation. FIG. 3C illustrates a fabrication process for a mushroom structure optomechanical vibratory gyroscope. FIG. 3C shows the fabrication process of the mushroom/wine-glass structure. First, a thick sacrificial layer 306 is deposited on a substrate 303. Then, sacrificial layer 306 is etched to form a mushroom mold 307. Next, a thin-film device layer 308 is deposited on top of the mold and patterned. Lastly, the device is released by removing the mold using wet etching creating voids 310.

Figure 17:
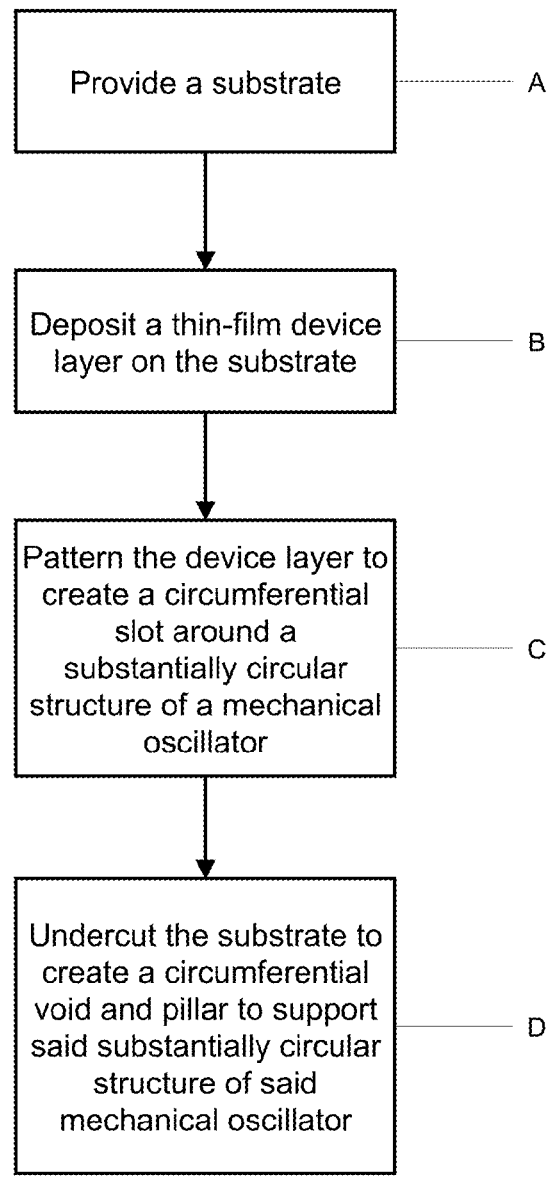
FIG. 17 shows the steps of an exemplary process to fabricate an integrated optomechanical disk vibratory gyroscope device.

FIG. 17 shows the steps for an exemplary process to fabricate an integrated optomechanical disk vibratory gyroscope device including the steps of: A) Provide a substrate; B) Deposit a thin-film device layer on the substrate; C) Pattern the device layer to create a circumferential slot around a substantially circular structure of a mechanical oscillator; and D) Undercut the substrate to create a circumferential void and pillar to support said substantially circular structure of said mechanical oscillator.

Figure 18:
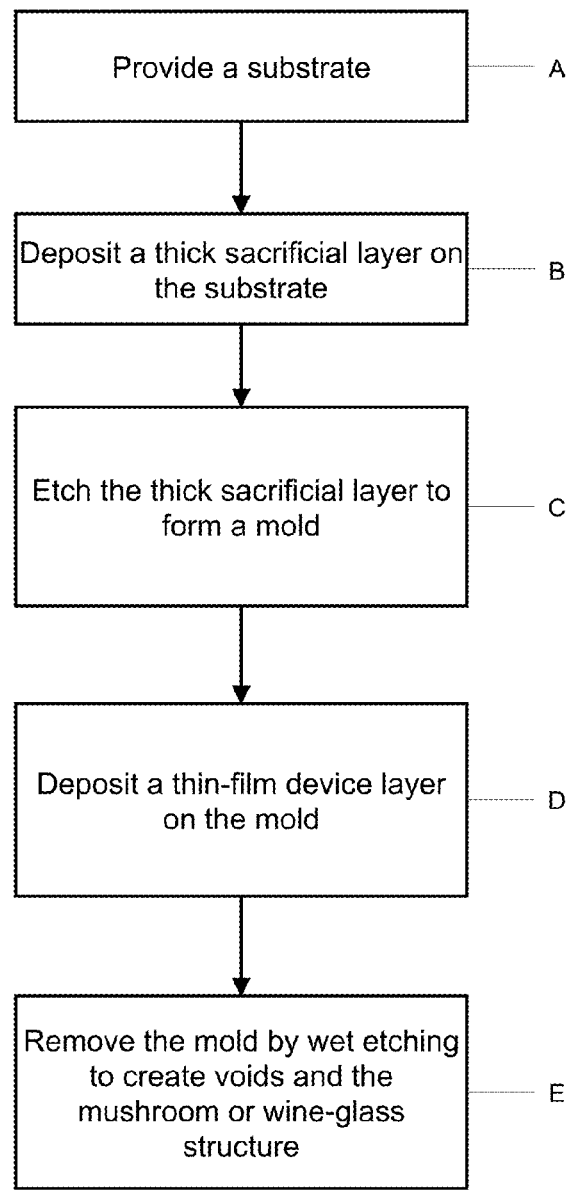
FIG. 18 shows the steps of another exemplary process to fabricate an integrated optomechanical disk vibratory gyroscope.

FIG. 18 shows the steps for another exemplary process to fabricate an integrated optomechanical disk vibratory gyroscope device comprising the steps of: A) Provide a substrate; B) Deposit a thick sacrificial layer on the substrate; C) Etch the thick sacrificial layer to form a mold; D) Deposit a thin-film device layer on the mold; and E) Remove the mold by wet etching to create voids and the mushroom or wine-glass structure.

Optomechanical cavities: FIG. 4A, FIG. 4B, and FIG. 4C show exemplary embodiments of optomechanical cavities suitable for use in an optomechanical disk vibratory gyroscope as described herein. FIG. 4A shows an illustration of a Fabry-Perot cavity 410 with two mirrors, first mirror 411 and second mirror 412. The first mirror 411 is attached to the sensing oscillator 413 and end-minor, second mirror 412 is fixed to the ground 414. FIG. 4B shows an illustration of a slotted photonic-crystal nanobeam 420. One arm 421 is attached to the oscillator 422, and the other arm 423 is coupled to ground 424. For both the Fabry-Perot cavity and the photonic-crystal cavity, the optical cavity has one-end connected to the sensing mechanical oscillator (m), and the other cavity end is grounded. Optical wave is highly confined in the gap separation. The displacement of the oscillator changes the gap size and thus changes the confinement of the optical wave. FIG. 4C shows an illustration of a whispering-gallery-mode (WGM) optical cavity 430 which is attached to the ground 434. There is a sub-wavelength gap 432 between the WGM cavity 431 and the sensing oscillator 433. The wave is highly confined in the optical cavity. Thus, changes of the gap between the WGM cavity and the mechanical oscillator perturb the evanescent wave and change the confinement of the optical wave. The change of the mechanical displacement can be measured by detecting the change of the optical transmission.

Figure 5A:
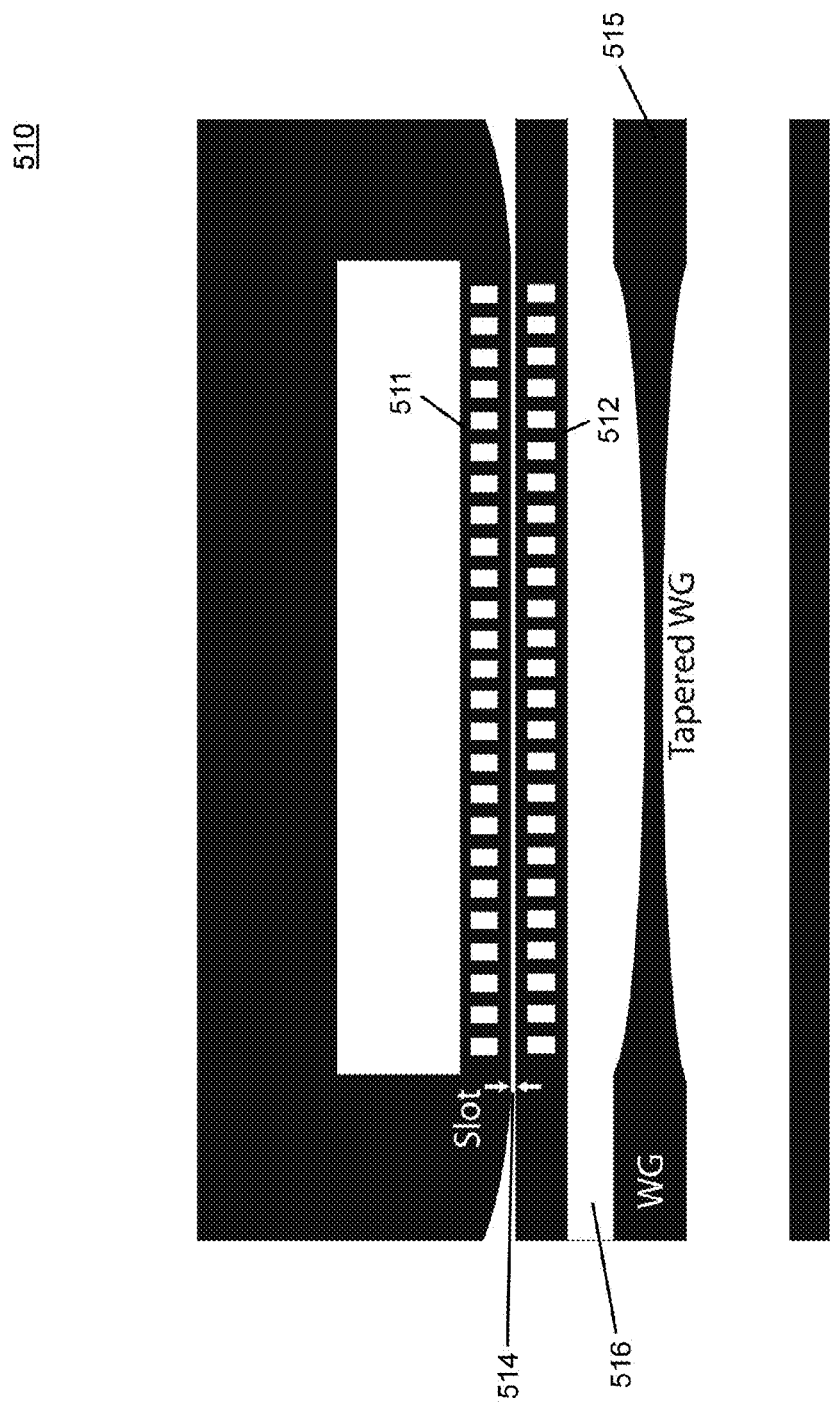
FIG. 5A shows an illustration of exemplary one-dimensional photonic-crystal coupled nanobeams cavity suitable for use in an optomechanical disk vibratory gyroscope.
Figure 5B:
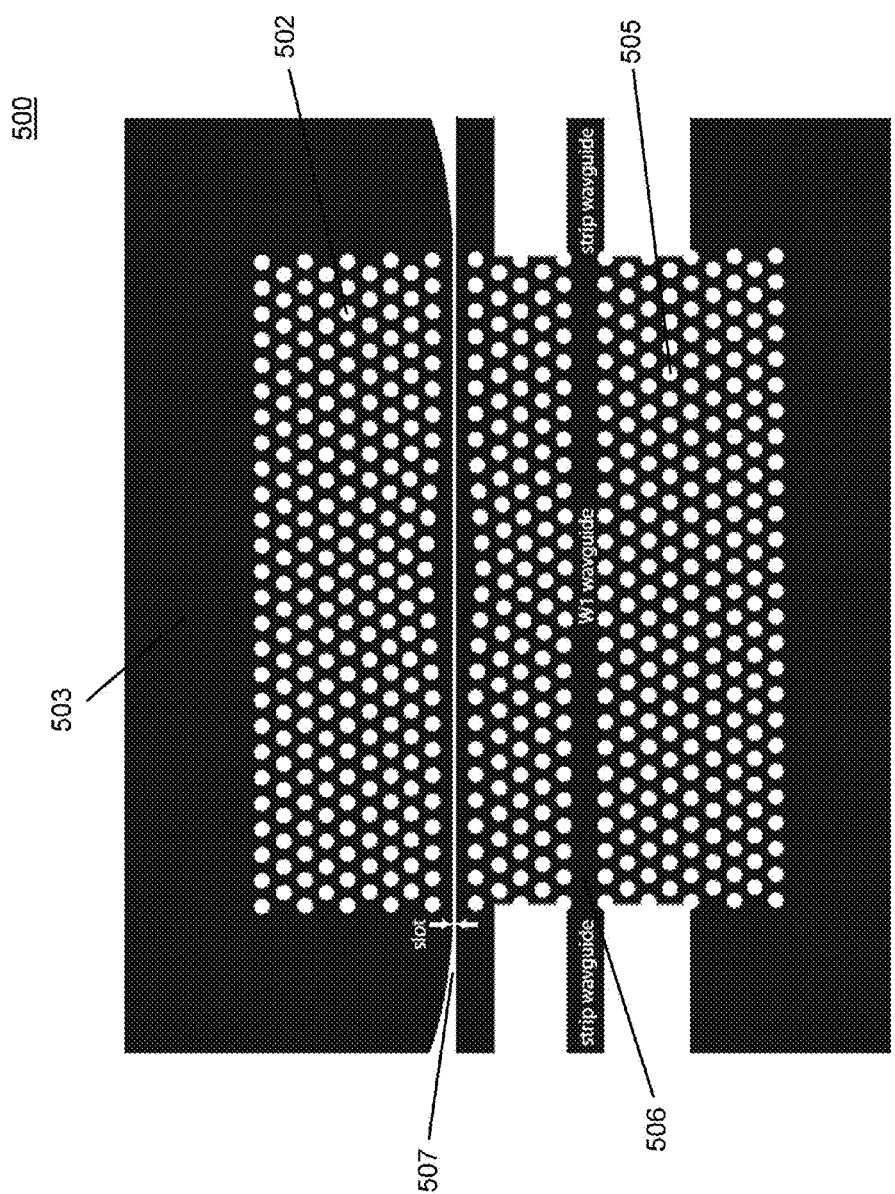
FIG. 5B shows an illustration of exemplary slotted two-dimensional photonic-crystal cavity suitable for use in an optomechanical disk vibratory gyroscope.

Photonic-crystal cavity: FIG. 5A and FIG. 5B show exemplary slotted photonic-crystal cavities, an optomechanical cavity which is based on photonic crystals.

FIG. 5A shows an exemplary one-dimensional (1-D) photonic-crystal coupled nanobeam 510 which includes a pair of beams (511, 512) with rectangular periodic holes arranged in 1-D. The pair of beams are separated by a slot 514. A defect cavity can be formed by reducing the periodicity of the holes at the center of the beam. In the exemplary embodiment of FIG. 5A, beam 511 is attached to the mechanical oscillator, and another beam 512 is mechanically grounded. Light can be coupled into/out-of the coupled nanobeams by using a tapered waveguide 515. Tapered waveguide 515 allows the optical waves to be less confined in the waveguide core. The width and the length of the taper can be optimized such that light is more effectively coupled into/out-of the optomechanical cavity. In order to control the coupling strength, the gap 516 between the cavity and the tapered waveguide can also be tuned. Such tuning can be achieved, for example, by applying an electrostatic charge on the tapered waveguide, such as, by biasing the taper waveguide with electrical potential. The tapered waveguide 515 can be butt coupled to a pair of optical input/output strip waveguides.

FIG. 5B shows an exemplary slotted two-dimensional (2-D) photonic-crystal cavity 500, a circular hole lattice is arranged in 2-D hexagonal orientation. The slot defect cavity includes a slot 507 and is formed by shifting the nearby holes outward [20]. A first side of the photonic crystal 502 is embedded in the mechanical oscillator 503, and a second side 505 of the photonic crystal is grounded. Light can be coupled into/out-of the optomechanical cavity by using a W1 defect waveguide 506. The W1 waveguide is a line defect by removing one row of holes. In FIG. 5B, waveguide 506 is parallel to the slotted photonic-crystal cavity. The optical coupling strength can be tuned by the distance between the slotted cavity and the W1 waveguide. The W1 waveguide can be butt coupled to a pair of optical input/output strip waveguide.

Figure 6A:
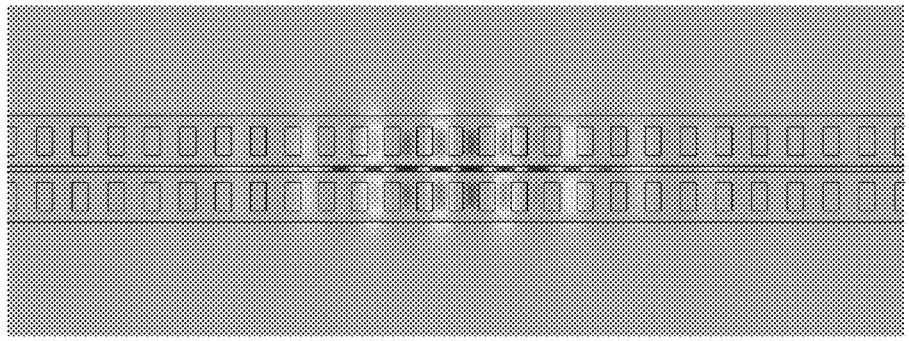
FIG. 6A shows a simulation of the optical electric-field mode profile of an exemplary one-dimensional photonic-crystal coupled nanobeams cavity.
Figure 6B:
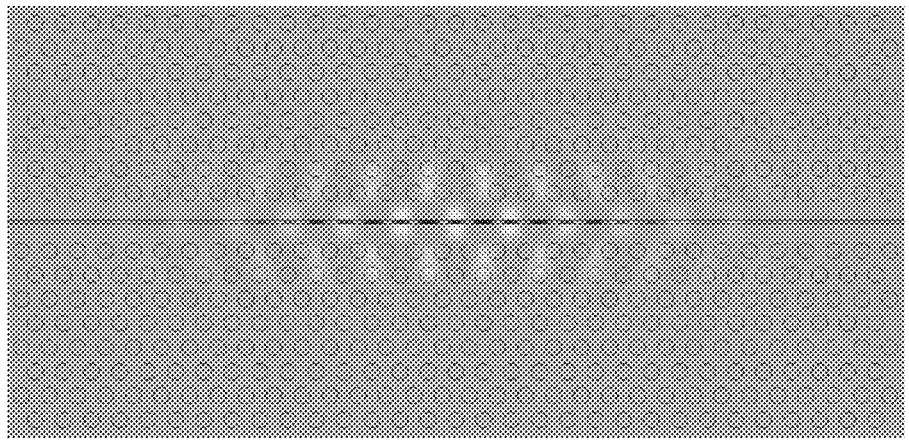
FIG. 6B shows a simulation of the optical electric-field mode profile of an exemplary slotted two-dimensional photonic-crystal cavity.

FIG. 6A and FIG. 6B show simulations of the optical electric-field mode profile of exemplary slotted photonic-crystal cavities in the TE-polarization (electric field parallel to the plane). The electric-field is highly confined inside the slot, which means a strong interaction between the photons and the mechanical displacement of the slot. The simulated optomechanical coupling constant for both cavities is about $g_{OM}=2\pi \times 100$ GHz/nm. FIG. 6A shows the optical mode profile of coupled one-dimensional photonic-crystal nanobeams with optical quality factor of $Q_o \sim 10^6$. FIG. 6B shows the optical mode profile of two-dimensional slotted photonic crystal cavity with optical quality factor of $Q_o \sim 10^5$.

Figure 7A:
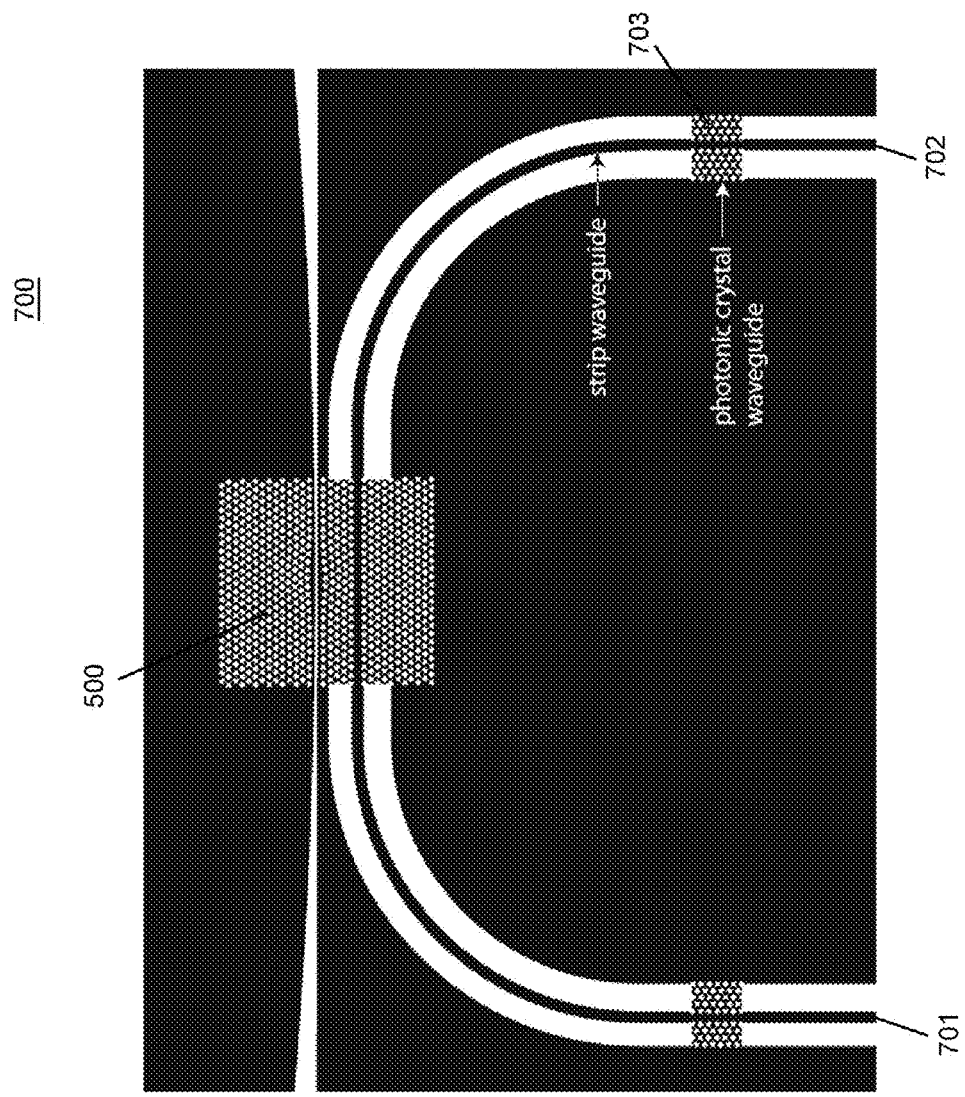
FIG. 7A shows a top-view diagram of an exemplary optomechanical cavity coupled with optical strip waveguides.
Figure 7B:
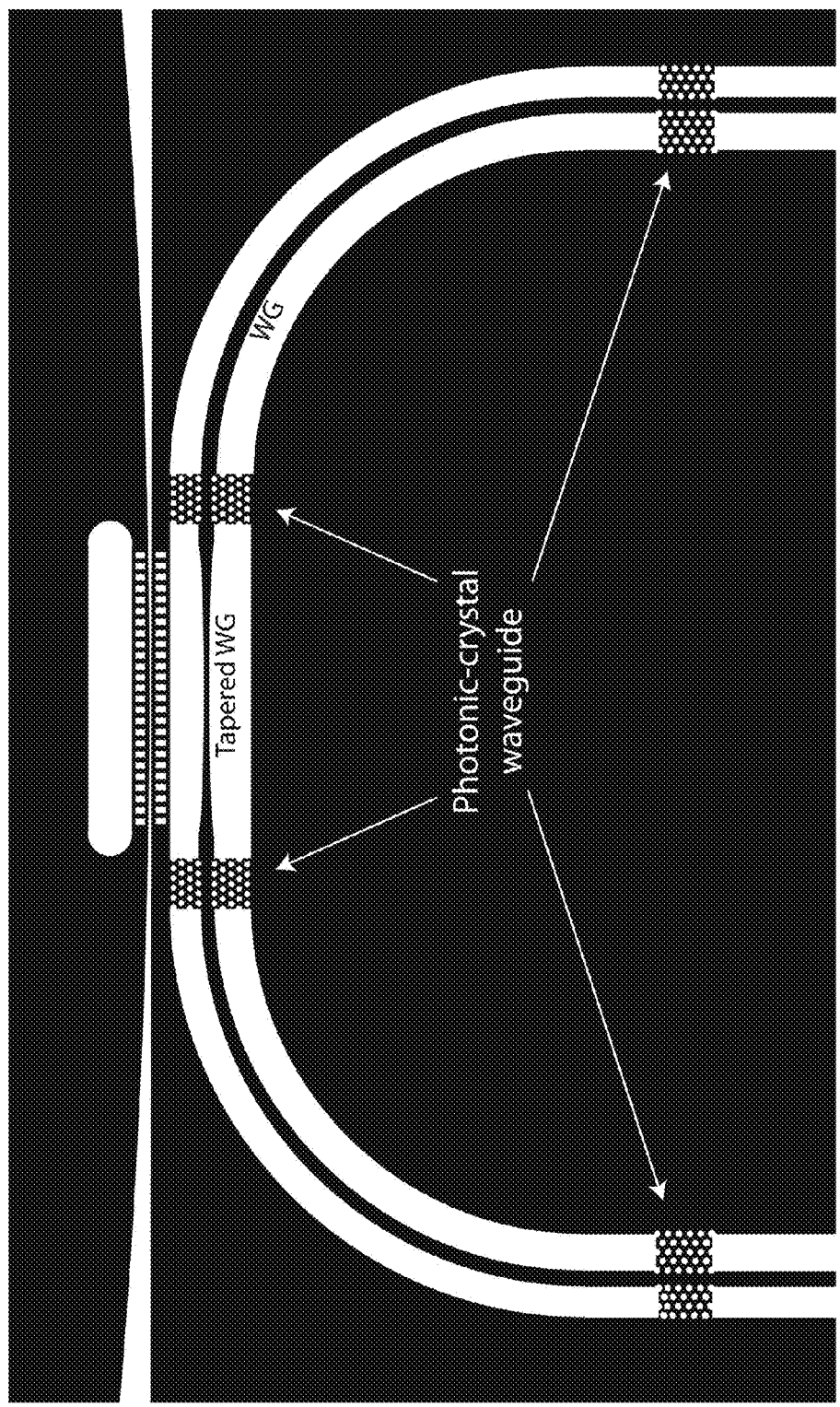
FIG. 7B shows another exemplary embodiment of an exemplary optomechanical cavity based on nanobeams.

Optical strip waveguides: FIG. 7A shows a top-view diagram of an exemplary optomechanical cavity 700 coupled with optical strip waveguides. A pair of optical waveguides, first waveguide 701 and second waveguide 702, couple light into and from the optomechanical cavity. The waveguides have a bend in order to route the optical signal on the chip. In order to support the undercut waveguide, the strip waveguide is butt coupled to a short photonic-crystal waveguide 703 for mechanical support. The photonic-crystal waveguide connects the strip waveguides. At the end of the waveguide, light is coupled to the off-chip photodetector (not shown in FIG. 7A) and light source (not shown in FIG. 7A) such as, for example, by use of optical fiber. Light can be coupled from the waveguide to the optical fiber, for example, by using grating coupler (out-of-plane coupling) or a modeconverter at the end-facet of the chip (in-plane coupling). FIG. 7B shows another exemplary embodiment of an exemplary optomechanical cavity based on nanobeams.

Figure 8:
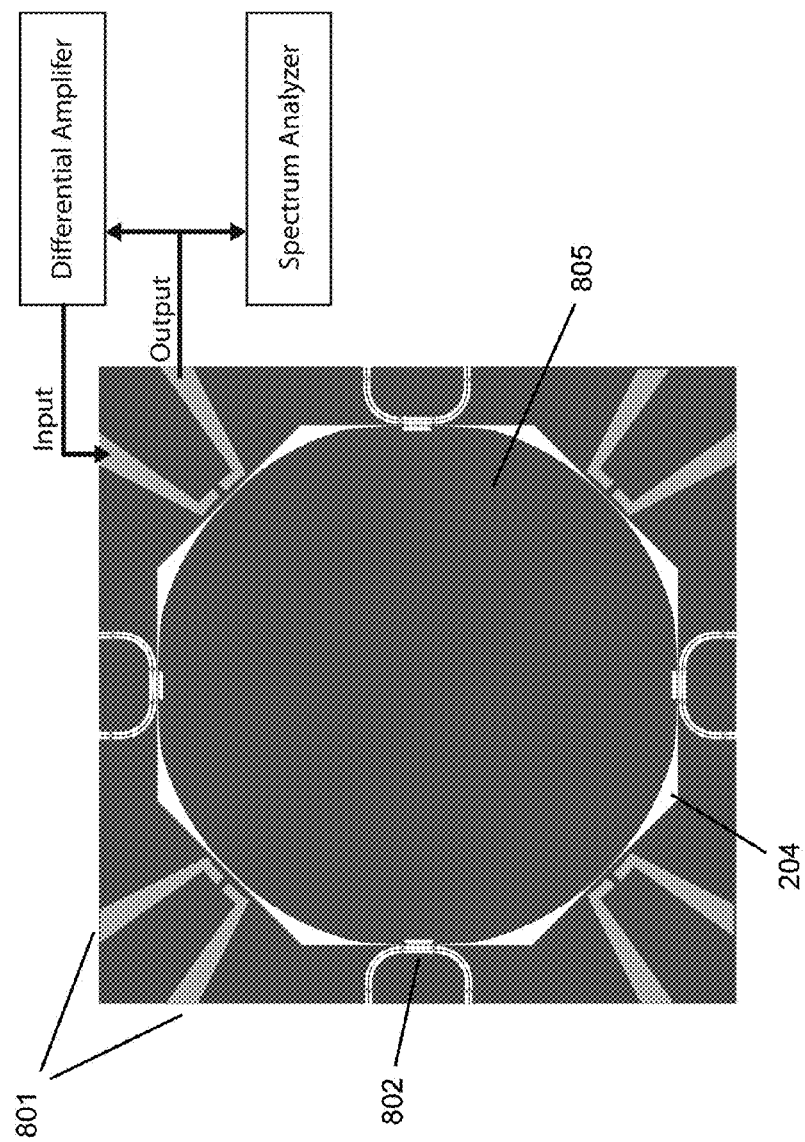
FIG. 8 shows a top-view schematic diagram of an exemplary optomechanical disk gyroscope.

Electrical actuators: FIG. 8 shows an exemplary optomechanical disk vibratory gyroscope 800 with electrical driving electrodes (four pairs of electrodes 801) and sensing optomechanical cavities (four optomechanical one-dimensional coupled nanobeams cavities 802). The mechanical oscillator is a thin-film disk 805 (e.g. a circular thick disk 201 and a thin-film disk 202) which is supported by a pillar 203 (not shown in FIG. 8) under the disk. There is a slot (gap 204) between the disk and the outside driving and sensing circuitry. For symmetry, there are four optomechanical cavities 802 (at North, East, South, and West) and four pair of electrodes 801 (at Northeast, Southeast, Southwest, and Northwest The displacement of the sensing mode is measured by the optomechanical cavities. The electrodes 801 in close proximity to the slot (gap 204). Electrodes 801 are placed across gap 204 in the surrounding structure (i.e. outside of the disk). The exemplary electrode 801 is a thin rectangular metal plate which is aligned in parallel to the gap. Operation of the actuators in Reference [21]: one of the electrode (output) is a mechanical readout. The output signal is read by a electrical spectrum analyzer. In order to excite the mechanical driving mode, the output signal is amplified by a differential amplifier. And the amplified signal is fed to another electrode (input) to excite the disk mechanically. The feedback loop can selectively amplified desired mechanical mode by design an appropriate electrical band pass filter in the amplifier.

Figure 9A:
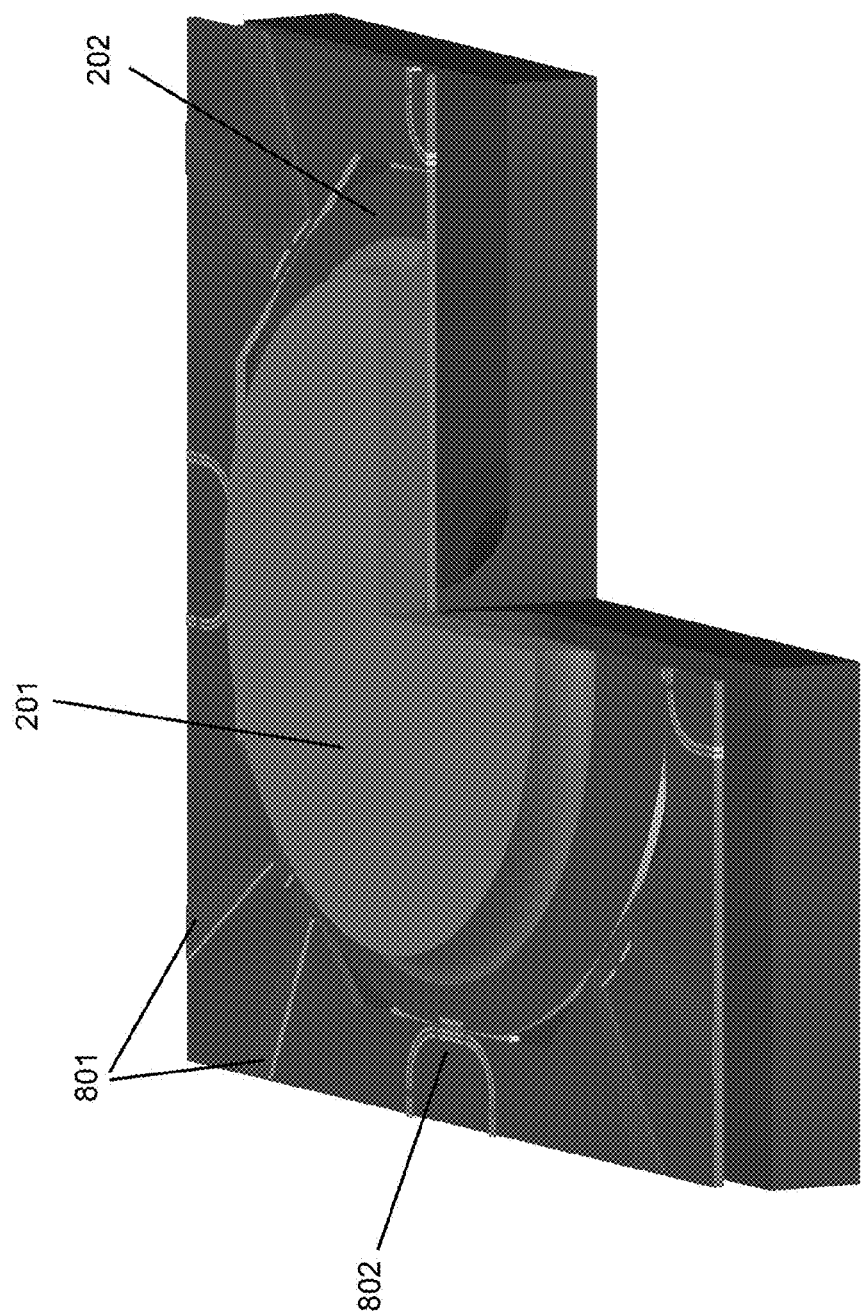
FIG. 9A shows an exemplary isometric cutaway view of an optomechanical vibratory gyroscope with a hat structure.
Figure 9B:
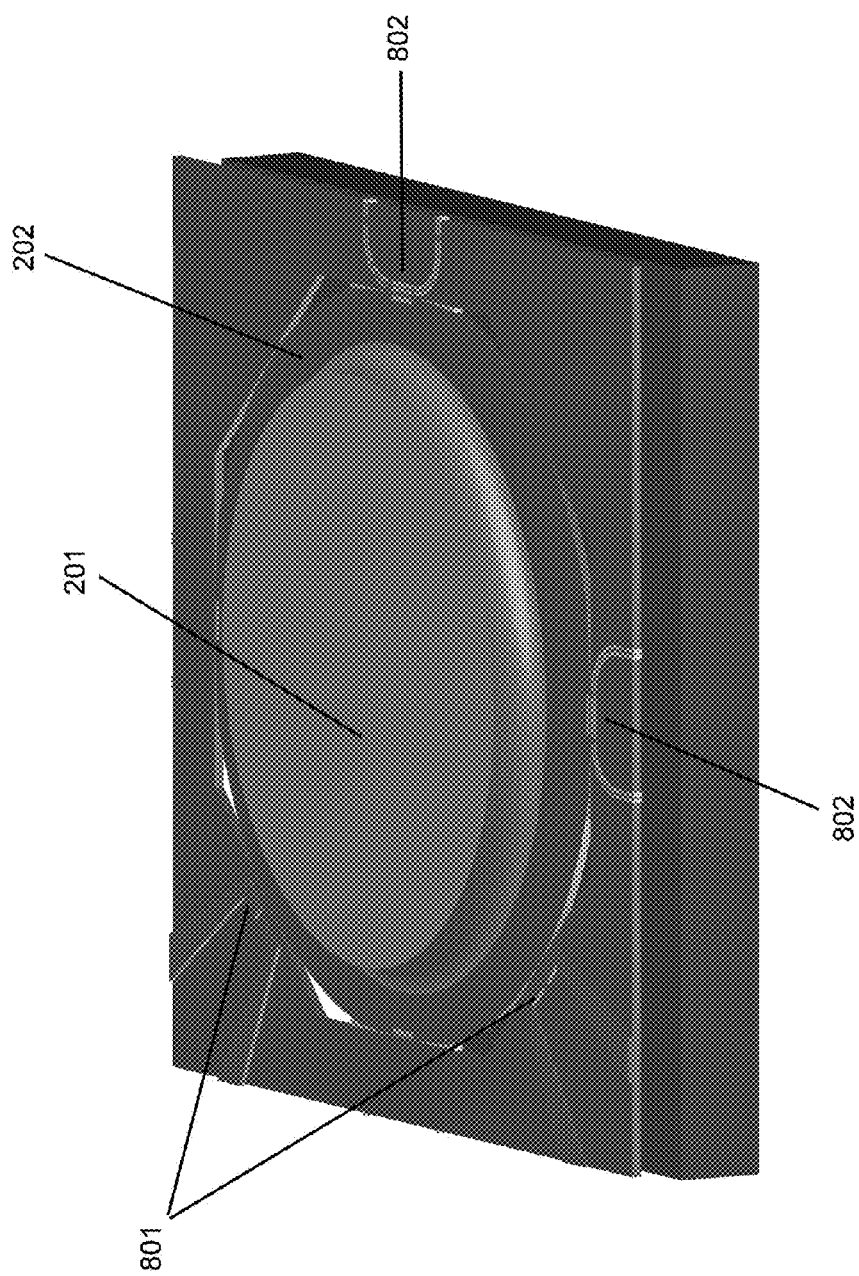
FIG. 9B shows an exemplary isometric view of an optomechanical vibratory gyroscope with a hat structure having two actuators and two sensors.
Figure 10C:
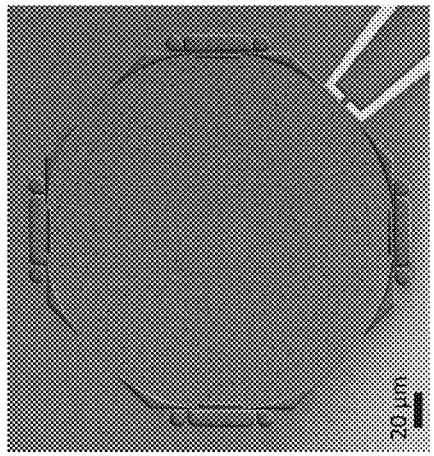
FIG. 10C shows a top-view SEM image of an exemplary disk optomechanical gyroscope includes a pair of electrical electrodes.
Figure 10F:
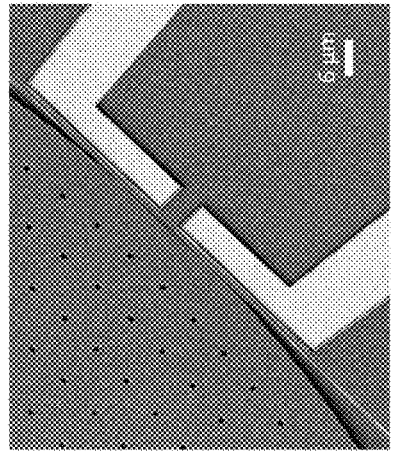
FIG. 10F shows a top-view SEM image of an exemplary electrical actuator includes a pair of electrodes.
Figure 10B:
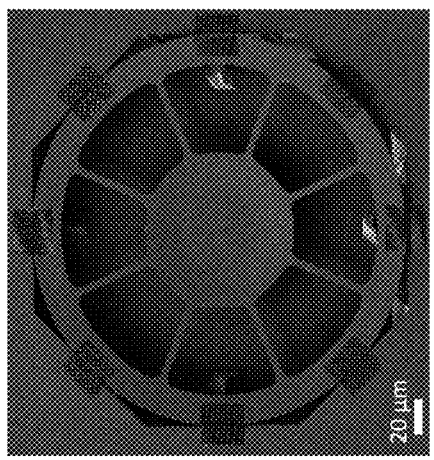
FIG. 10B shows a top-view SEM image of an exemplary ring optomechanical gyroscope.
Figure 10E:
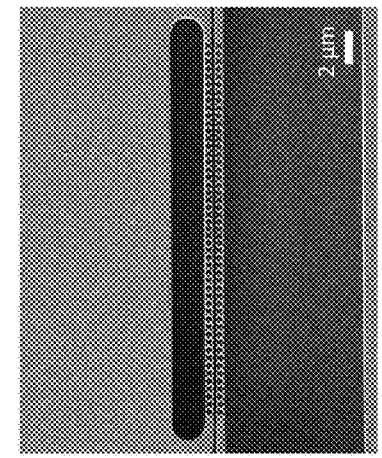
FIG. 10E shows a top-view SEM image of an exemplary optomechanical one-dimensional photonic-crystal coupled nanobeams cavity.
Figure 10A:
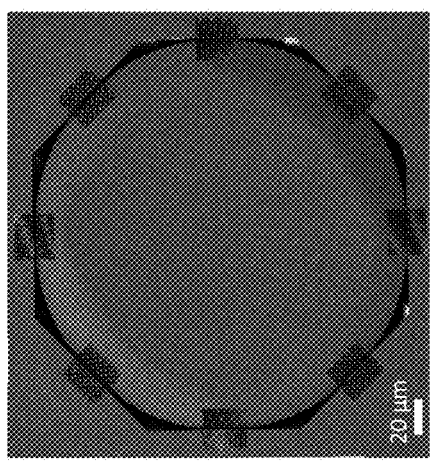
FIG. 10A shows a top-view scanning electronic microscope (SEM) image of an exemplary disk optomechanical gyroscope.
Figure 10D:
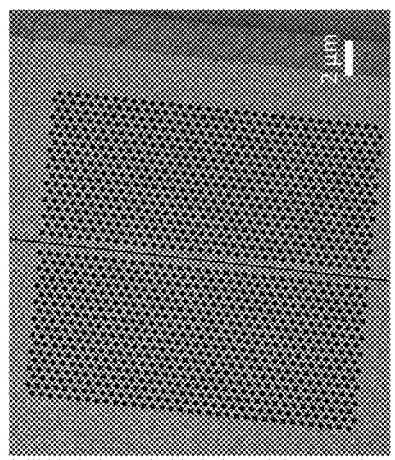
FIG. 10D shows a top-view SEM image of an exemplary optomechanical slotted two-dimensional photonic-crystal cavity.

Hat structure: FIG. 9A shows a three-dimensional (3-D) schematic of an exemplary optomechanical vibratory gyroscope similar to the optomechanical vibratory gyroscope 800 of FIG. 8 with a hat structure. The hat oscillator includes a circular thick disk 201 and a thin-film disk 202 with embedded optomechanical sensors optomechanical cavities 802. For displacement actuation, the oscillator is driven electrically by pairs of metal electrodes 801. Pillar 203 can be seen to be protruding from undercut substrate 207. The hat oscillator is driven electrically by the electrodes 801 and the optomechanical displacement sensors 802 are based on the one-dimensional photonic-crystal coupled nanobeams cavities. The disk is supported by a pillar 203. The pillar 203 diameter is small enough to avoid strong mechanical perturbation to the oscillation breathing mode. FIG. 9B shows an exemplary isometric view of an optomechanical vibratory gyroscope with a hat structure having two actuators and two sensors;

Electron microscope images: FIG. 10A, FIG. 10B, FIG. 10C, FIG. 10D, FIG. 10E, and FIG. 10F show top-view scanning electron microscope (SEM) images of exemplary optomechanical vibratory gyroscopes. FIG. 10A shows a top-view SEM image of an exemplary disk optomechanical gyroscope. FIG. 10B shows a top-view SEM image of an exemplary ring optomechanical gyroscope (a ring/wheel structure). In FIG. 10A and FIG. 10B, we use optomechanical slotted 2-D photonic-crystal cavities for the displacement driving and displacement sensing. The device layer is silicon nitride and the substrate is silicon. FIG. 10C shows a top-view SEM image of an exemplary disk optomechanical gyroscope. The device is low stress silicon nitride and the substrate is thermal oxide on silicon. Released holes are patterned on the disk for the ease of undercut process. In this example, we use optomechanical 1-D photonic-crystal coupled nanobeams for displacement sensing, and a pair of electrodes for displacement driving. FIG. 10D shows a top-view SEM image of an exemplary optomechanical slotted photonic-crystal cavity. FIG. 10E shows a top-view SEM image of an exemplary optomechanical 1-D photonic-crystal coupled nanobeams cavity. Optomechanical slotted photonic-crystal cavities can be used for the displacement driving and displacement sensing. FIG. 10F shows a top-view magnified SEM image of a pair of driving electrodes of FIG. 10C.

Summary of Exemplary Embodiments: An integrated optomechanical disk vibratory gyroscope device (e.g. FIG. 8A, FIG. 8B, FIG. 9A) includes a mechanical oscillator (e.g. 201, 202) having a substantially circular structure (e.g. FIG. 2A, FIG. 2B, FIG. 2C, a ring or wheel structure, a hat structure, or a mushroom or wine-glass structure). The substantially circular structure is mechanically coupled to and supported by a pillar (e.g. pillar 203, FIG. 2C, FIG. 8, FIG. 9A, and mechanically isolated from a surrounding structure by a gap or slot (e.g. gap 204). The pillar can be a protrusion from an undercut substrate (e.g. a pillar 203 protruding from an undercut substrate 207, FIG. 2C, or any other suitable pillar equivalent structure, such as, for example, the stem or pillar of the inverted wine-glass structure of FIG. 2D. Displacement actuators are disposed in a surrounding structure substantially adjacent to and electro-mechanically or opto-mechanically coupled to the mechanical oscillator across the gap or slot. At least one pair of electrodes can be used for electrical driving (e.g. four pairs are shown in the exemplary embodiment of FIG. 8). One or more optomechanical cavities can be used for optical driving. Each of the actuators is configured to excite said mechanical oscillator in a driving mode (e.g. FIG. 1A). One or more optical transducers (e.g. optomechanical cavities 802, FIG. 8A) are disposed substantially in a plane (e.g. FIG. 9A) defined by said mechanical oscillator and radially disposed between each of the one or more actuators. Each of the one or more optomechanical cavities are configured to measure a displacement of said mechanical oscillator in a sensing mode (FIG. 1B).

Theoretical Basis

The following sections describe Applicant's best present understanding of the theoretical basis of operation to better assist those skilled in the art to understand the inventive structures and methods described herein. Although the theoretical description given herein is thought to be correct, the operation of the devices described and claimed herein does not depend upon the accuracy or validity of the theoretical description. Later theoretical developments that may explain the observed results differently from the theory presented herein will not detract from the structures and methods described herein.

Figure 11A:
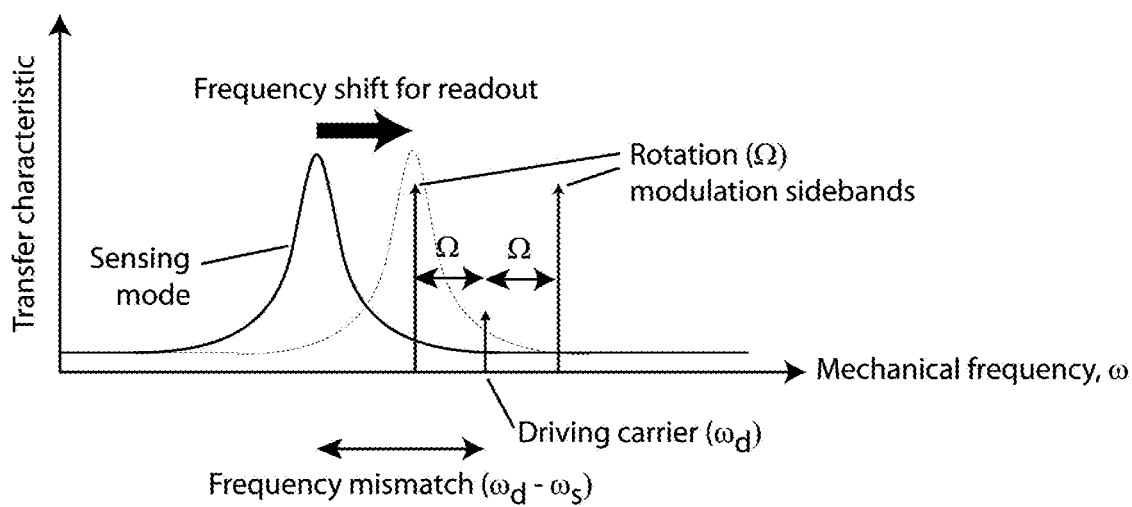
FIG. 11A shows a graph of an exemplary dynamic readout operation.

Displacement sensors: Turning now to a readout operation of an exemplary embodiment, the sensing mode can initially have a mechanical frequency mismatch with the driving mode. With optical spring effect in the optomechanical cavities, mechanical frequency and bandwidth of the mechanical driving/sensing modes of the gyroscope can be tuned due to optically induced rigidity. Such that, the performance of the gyroscopes can be improved includes sensitivity, bandwidth, noise equivalent rotation, and bias stability. One of the operation scheme to improve sensitivity and bandwidth by using optical spring effect: In the readout mode, the frequency of the sensing mode can be shifted to one of the modulation sidebands by using an optical spring effect. The sensing mechanical frequency can be shifted optically by applying optical radiation pressure with intense optical light in the optomechanical cavities. This optical spring effect depends on the optical input. In such a way, the rotation induced modulation signal, which is carried by the driving frequency, is mechanically coupled to the sensing mode for readout. The mechanical gain is increased as the modulation sideband is amplified by the sensing resonance. For saving power (an idle mode), we can reduce (switch off) the optical input power such that the sensing mode is shifted back to the intrinsic frequency. With the optical spring effect, the modified mechanical frequency can be written as:

$$f = f_0(1 + \eta_{OS} P_{in}),$$ (Equation 1)

where $f_0$ is the intrinsic mechanical frequency, $\eta_{OS}$ is the optical spring coefficient, and $P_{in}$ is the optical input power. FIG. 11A is a graph showing an exemplary dynamic readout operation. The readout mode is shown by the dashed line and the idle/power-saving mode is shown by the solid line.

Figure 11B:
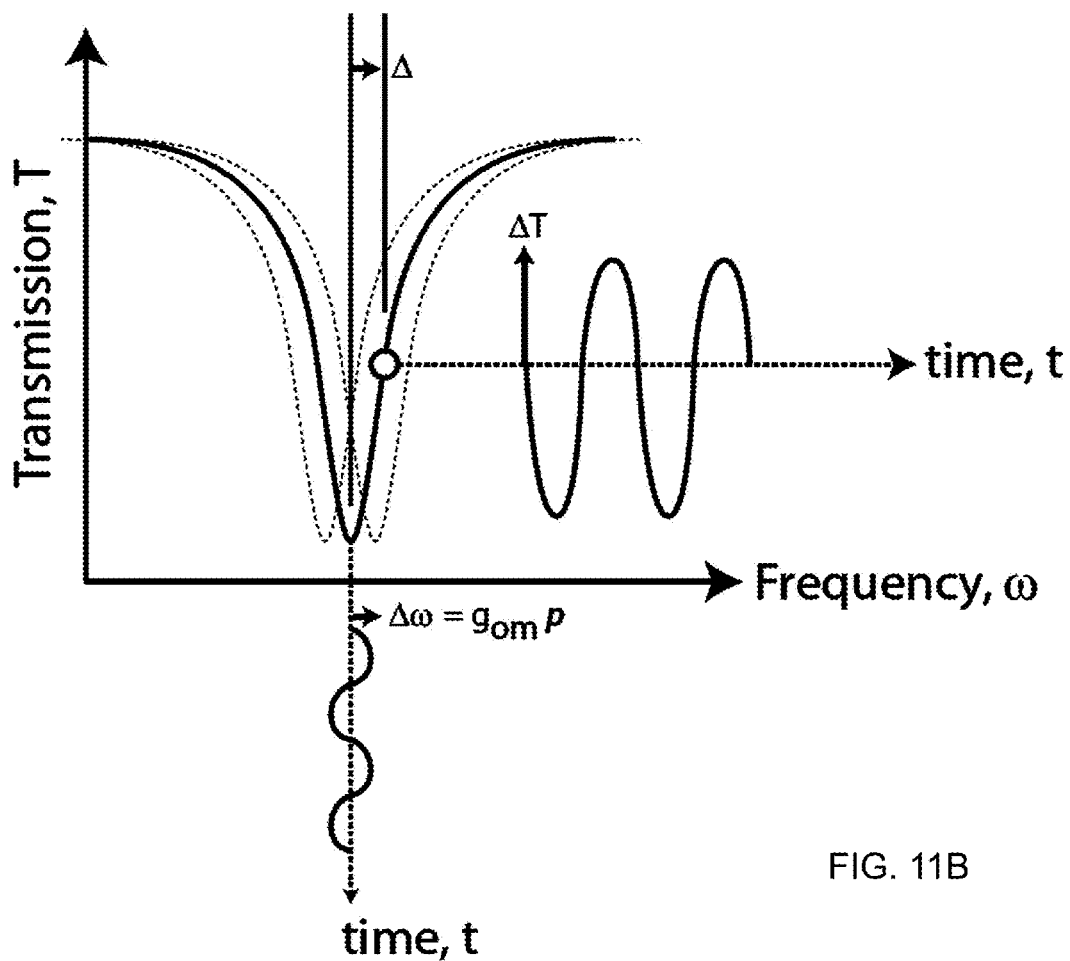
FIG. 11B shows a graph of the transmission spectrum of an exemplary optomechanical cavity plotted against frequency.

Optical displacement transducer: For the theoretical analysis which follows, an embodiment is described in which the optical displacement transducer is based on an optomechanical cavity. The optomechanical cavity is mechanically attached to the mechanical oscillator to detect localized displacement motion. A continuous-wave laser light is in-coupled to the optomechanical cavity with a small optical frequency detuning to the resonance. A photodetector is used to measure the transmission optical power. When the rotation is present, oscillation is induced on the sensing mode. The mechanical oscillation of the sensing mode is coupled to the optomechanical cavity. Such cavity displacement shifted the optical resonances and the optical transmission power is modulated. FIG. 11B shows a graph of the transmission spectrum (the solid line) of an exemplary optomechanical cavity plotted against frequency. Through the optomechanical coupling, the displacement (p) of the mass shifts the cavity resonance frequency by $\Delta = g_{OM} p$, where $g_{OM}$ is the optomechanical coupling coefficient. The change of optical transmission follows the induced laser-cavity detuning by the equation $\Delta = \omega_l - \omega_c$. As the mechanical frequency is much smaller than the bandwidth of the optical bandwidth, the change of transmission ($\Delta T$) is approximated to:

$$\Delta T = \frac{dT}{d\Delta} \Delta,$$ (Equation 2)

where $dT/d\Delta$ is the linear slope of the optical transmission in the detuning side. Assume the displacement is modulated and therefore the frequency component of the transmitted optical power corresponds to $$P_m(\omega) = \frac{dT}{d\Delta} P_{det} \delta_{OM} p(\omega),$$ (Equation 3)

where $P_{det}$ is the transmitted optical power measured by the photodetector. In order to maximize the transduction, we fix the laser frequency detuning to the red-side of the resonance at $\Delta = -\kappa/2$ such that $dT/d\Delta$ is maximum, where $\kappa$ is the total cavity decay rate. It results $$P_m(\omega) = (1 - T_d) \frac{Q_0}{\omega_0} \eta_{in} P_{in} g_{OM} p(\omega),$$ (Equation 4)

where $Q_0$ is the quality factor of the optomechanical cavity, $\omega_0$ is the resonance frequency of the cavity, $\eta_{in}$ is the transmission from cavity to detector, and $T_d$ is the transmission dip.

Displacement actuators: There are at least two ways to implement the displacement actuators. One way is by use of conventional electrical capacitors driven by an electrical-potential. FIG. 8 shows an exemplary electrical actuator having a pair of electrodes. Another way is by use of optomechanical cavities. Optical gradient force is generated by pumping the optomechanical cavity with optical wave. The mass can be efficiently driven by modulating the pump amplitude at the mechanical resonance frequency.

Figure 12A:
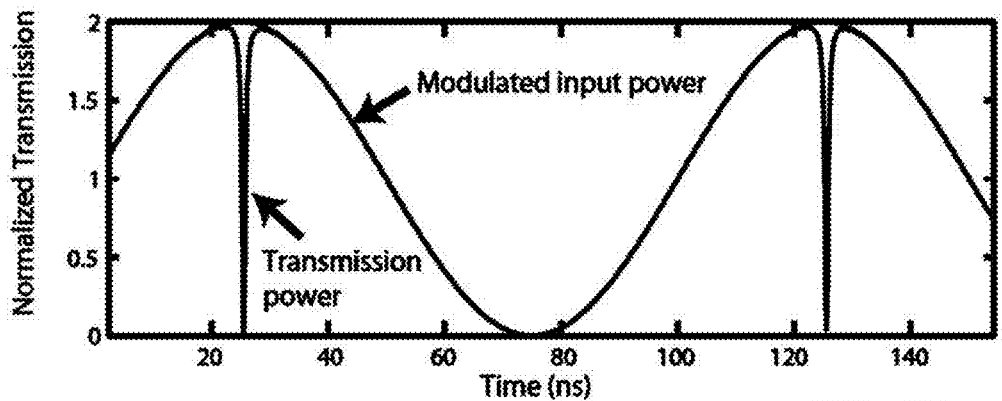
FIG. 12A shows a graph of normalized transmission plotted vs. time.
Figure 12B:
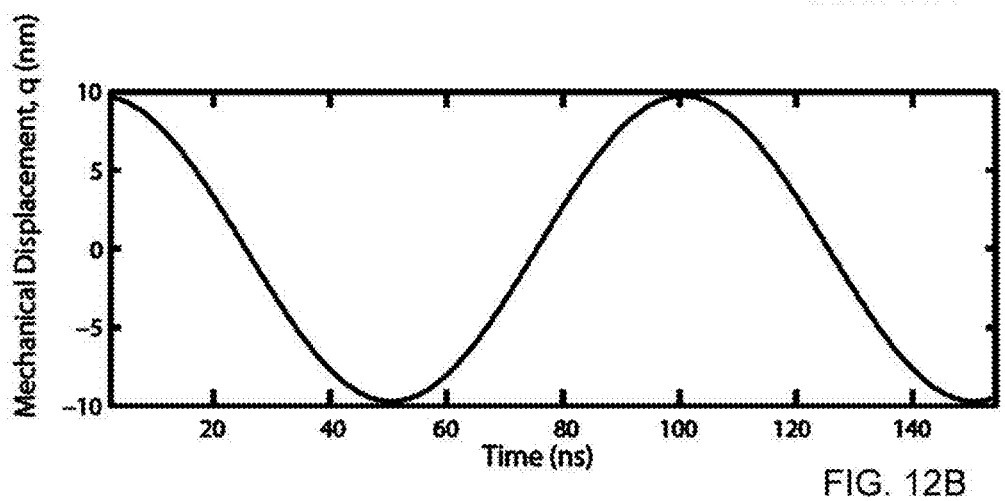
FIG. 12B shows a graph of mechanical displacement plotted vs. time.
Figure 12C:
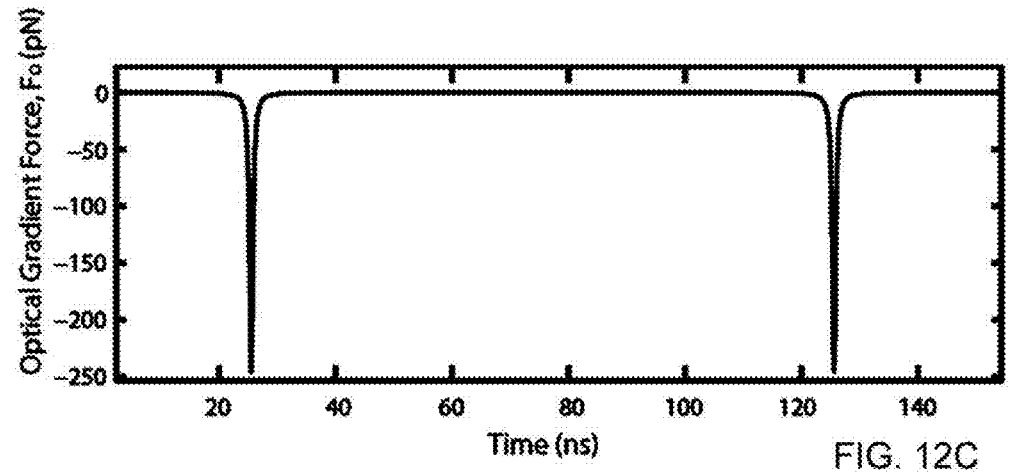
FIG. 12C shows a graph of optical gradient force plotted vs. time.

Operation of an optomechanical cavity used for displacement driving: FIG. 12A, FIG. 12B, and FIG. 12C show the transient response of the optical transmission, the mechanical displacement (q) and the generated optical force (F) respectfully. The pump input power is modulated as $P_p = P_{p0}(1 + A_m \cos(\omega_m t))$, where $P_{p0}$ is the average pump power, $A_m$ is the modulation amplitude and the $\omega_m$ is the modulation frequency. Here, the modulation frequency is matched to the mechanical resonant frequency, $\omega_m = \omega_d$. Most of the time within a period of the oscillation, the laser-cavity detuning is larger than the linewidth of the cavity $\Delta_c \gg \Gamma_i$. Therefore, photons are depleted from the cavity and optical gradient force is generated only in a short period of time in each oscillate cycle. Optical gradient force is maximum at $\Delta_c = 0$, when the displacement is zero. The maximum gradient force is given by:

$$F_o = -\frac{g_{OM}|a_p|^2}{\omega_p} = -\frac{g_{OM}}{\omega_p}\left|\frac{i\sqrt{\Gamma_e}\,A_p}{\Gamma_i/2 - i\Delta_o}\right|^2 = -\frac{g_{OM}P_p}{\omega_p\Gamma_i} \quad \text{(Equation 5)}$$

Calculated performance, analysis and discussion of the resolution of the gyroscope by means of noise equivalent rotation: Resolution is defined as the minimum detectable rotation rate, and is limited by the noises from different sources. In this section, a variety of noises are discussed and their corresponding noise-equivalent rotation and noise power-spectral densities (PSD) are be derived. In order to cooperate with the real-world signal measurement, single-sided PSD is considered throughout the analysis.

Mechanical effective mass and Coriolis coupling coefficient: Effective mass of the driving mode (d) or sensing mode (s) is expressed as $$m_{d,s} = \int \rho(\vec{r})|\vec{u}_{d,s}'(\vec{r})|^2 d^3\vec{r}, \quad \text{(Equation 6)}$$

where $\rho(\vec{r})$ is the density, $\vec{u}'(\vec{r})$ is the normalized mechanical displacement at position $\vec{r}$. The displacement is normalized to the specific interested location. The Coriolis coupling coefficient corresponds to the coupling strength between driving mode and sensing mode by Coriolis force. In mathematics, it is a value to measure the orthogonality of the driving displacement and the sensing displacement. Coriolis coupling coefficient is defined as $$\gamma = \frac{\hat{\Omega}\cdot\int\rho(\vec{r})(\vec{u}_d(\vec{r})\times\vec{u}_s(\vec{r}))d^3\vec{r}}{\sqrt{\int\rho(\vec{r})|\vec{u}_d(\vec{r})|^2 d^3\vec{r}}\sqrt{\int\rho(\vec{r})|\vec{u}_s(\vec{r})|^2 d^3\vec{r}}}, \quad \text{(Equation 7)}$$

where $\hat{\Omega}$ is the unit vector of angular velocity.

Thermal Brownian noise: Mechanical noise is given by the thermal Brownian motion of the proof mass with the contact of a thermal reservoir at temperature T. Noise-equivalent rotation (NEΩ) of $$\Omega_{th} = \frac{\sqrt{m_s k_B T \Gamma_s}}{\gamma q_d m_d \omega_d}, \quad \text{(Equation 8)}$$

where $q_d$ is the driving displacement, $\Gamma = \omega/Q$ is the mechanical bandwidth, $\omega$ is the angular mechanical frequency, Q is the mechanical quality factor, and $k_B$ is the Boltzmann constant. The subscript (d, s) represents driving mode (d) and sensing mode (s).

Optical shot noise: Optical shot noise is a quantum noise effect, which arises from the optical measurement in detecting the discreteness of photons using photodetectors. The optical-shot-noise-equivalent rotation corresponds to:

$$\Omega_{SN} = \frac{m_s}{2\gamma q_d m_d \omega_d}\frac{\omega_O}{(1-T_d)Q_O g_{OM}}\sqrt{\frac{2\hbar\omega_0(1+T_d)}{\eta_{qe}\eta_{in}P_{in}}}\frac{1}{|\chi_s(\omega)|} \quad \text{(Equation 9)}$$

where $\eta_{qe}$ is the quantum efficiency which is about 0.76 for a typical photodetector with responsivity R=1 A/W, $\omega_0$ is the optical frequency, and $P_{det} = 2T_O\eta_{in}P_{in}$ is the incident optical power. Here, we adopt the same balanced detection scheme used in Reference [14]. $T_O = (1+T_d)/2$ is the optical transmission of the cavity, $T_d$ is the coupling dip and $\eta_{in}$ is the transmission from the optical cavity to the detector. $\chi_s(\omega) = 1/(\omega_s^2 - \omega^2 + i\Gamma_s\omega)$ is the oscillator susceptibility of the mechanical sensing mode.

Detector noise: There is electronic noise in the photodetector, which depends on the electronic components in the detector. The detector-noise-equivalent rotation is $$\Omega_{DN} = \frac{m_s}{2\gamma q_d m_d \omega_d}\frac{\omega_O}{(1-T_d)Q_O\eta_{in}P_{in}g_{OM}}NEP\frac{1}{|\chi_s(\omega)|}, \quad \text{(Equation 10)}$$

where NEP is the noise-equivalent-power of the detector.

Backaction noise: Due to the photon shot noise, the photons generate a random radiation pressure force on the mechanical motion. This fluctuation of radiation pressure is the backaction noise $F_{BA}$. The backaction-noise-equivalent noise is:

$$\Omega_{BA} = \frac{\hbar g_{OM}}{2\gamma q_d m_d \omega_d}\sqrt{\frac{8n_{cav}}{\kappa}}, \quad \text{(Equation 11)}$$

where $\eta_{cav}$ is the number of photons in the cavity. In order to maximize the transduction, we detune the probe laser at $\Delta = -\kappa/2$. Therefore the number of photon in the cavity is:

$$n_{cav,\kappa/2} = (1-\sqrt{T_d})\frac{Q_O}{\omega_O}\frac{P_{in}}{\hbar(\omega_O - \kappa/2)} \quad \text{(Equation 12)}$$

Figure 13:
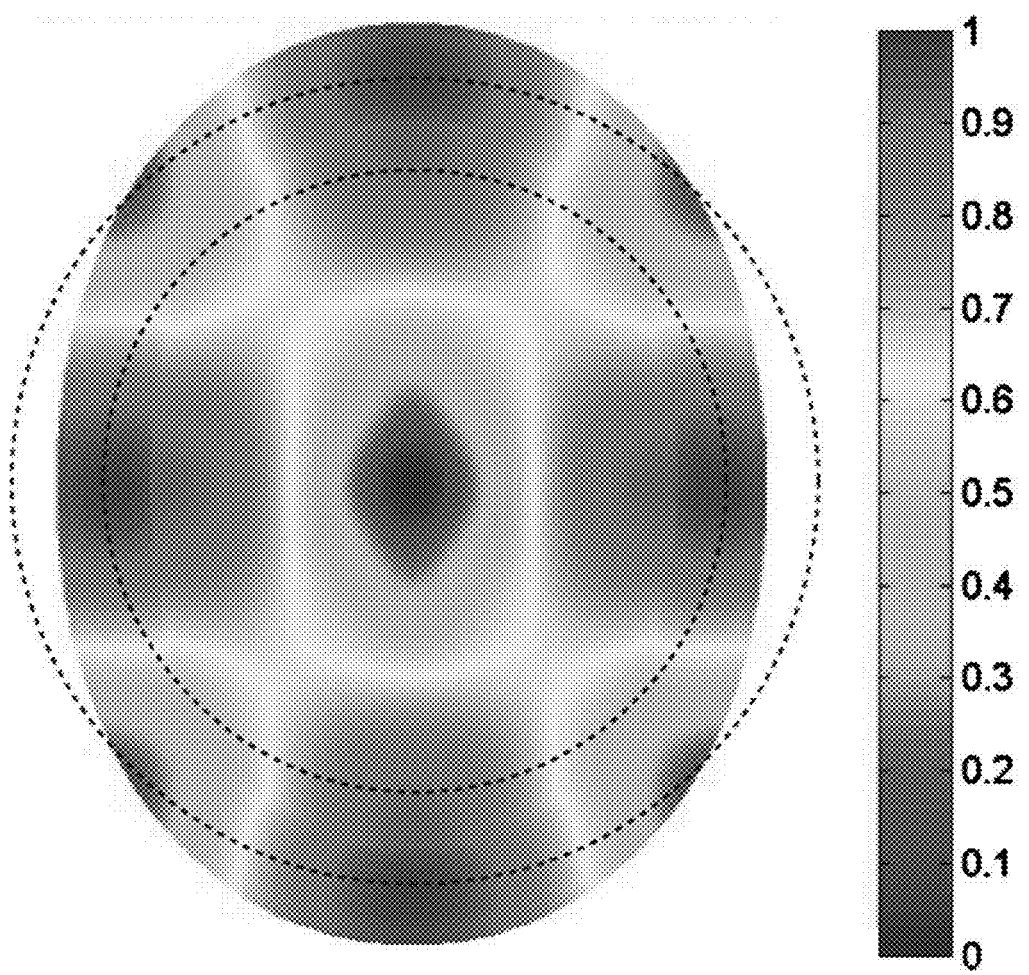
FIG. 13 shows a contour map of the calculated mechanical breathing mode of an exemplary hat structure.
Figure 14:
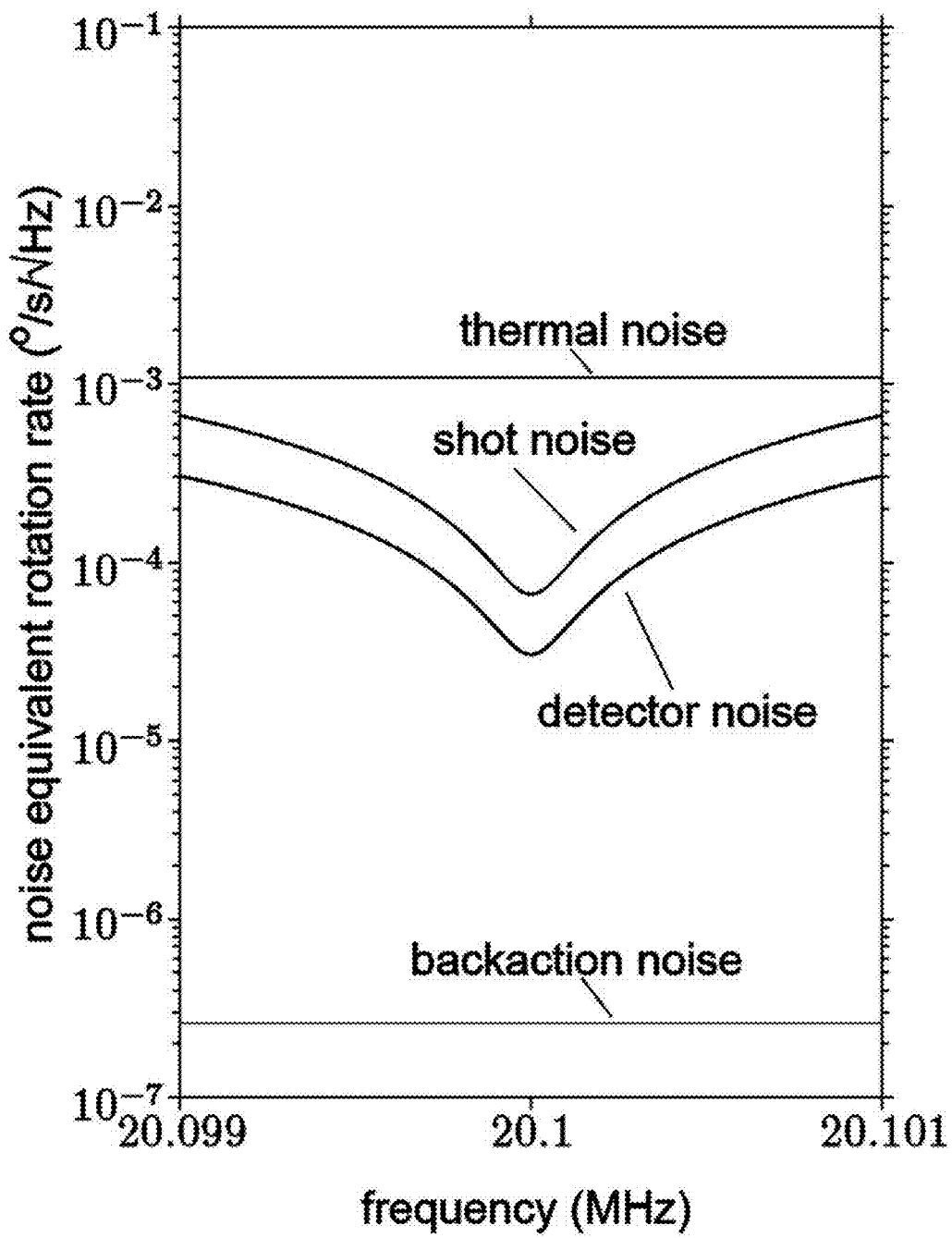
FIG. 14 shows a graph of noise equivalent rotation rate plotted vs. frequency for thermal noise, shot noise, detector noise, and backaction noise.

FIG. 13 shows a contour map of the calculated mechanical breathing mode of an exemplary hat structure. The grey scale represents the displacement magnitude. FIG. 13 is the calculated mechanical breathing mode of the hat structure based on the parameters in Table 1. The dotted line is the layout of the hat structure at rest. The color scale shows the normalized displacement magnitude of the structure FIG. 14 is a graph of the calculated noise equivalent rotation rate from different sources of noise. FIG. 14 shows the frequency dependent noise-equivalent rotation from several different sources, including thermal noise, shot noise, detector noise, and backaction noise. The calculations are based on the exemplary parameters from FIG. 15, table 1, mechanical parameters of the gyroscope with the hat structure, and FIG. 16, table 2, optomechanical parameters of the photonic-crystal cavity. It is contemplated that the performance of devices can be further improved by scaling the device's geometries. The thermal noise $\Omega_{th}$ and the backaction noise $\Omega_{BA}$ are white, while the shot noise $\Omega_{SN}$ and the detector noise $\Omega_{DN}$ are frequency-dependent which follow the inverse of the oscillator susceptibility. Therefore, the total noise is minimum ($\Omega_{total} = 1.08 \times 10^{-3}$ °/s/$\sqrt{Hz}$) at the resonant frequency $f_m$ which contributes the DC term of the rotation-rate signal.

Calculated bandwidth is 100 Hz. It is believed that such devices can provide tactical grade performance. Within the bandwidth, the noise-equivalent rotation is limited by the thermal noise. It is believed that the thermal noise depends mainly on the mechanical oscillator structure/material and the driving power.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] N. Yazdi, F. Ayazi, K. Najafi, "Micromachined inertial sensors," Proceedings of the IEEE 86, pp. 1640-1659 (1998).

[2] W. M. Macek and D. T. M. Davis, "Rotation rate sensing with traveling-wave ring lasers," Applied Physics Letters 2, pp. 67-68 (1963).

[3] H. C. Lefevre, H. J. Arditty, "Fiber-optic gyroscope," in Advances in Fibre-Optic Technology in Communications and for Guidance and Control, (North Atlantic Treaty Organization, 1992), pp. 8.

[4] S. Cho, A. T. King, A. Kourepenis, P. Maciel, M. Weinberg, "A micromachined comb-drive tuning fork rate gyroscope," in Proceedings of MEMS '93, An Investigation of Micro Structures, Sensors, Actuators, Machines and Systems. (IEEE, 1993), pp. 143-148.

[5] A. Sharma, M. F. Zaman, F. Ayazi, "A 104-dB dynamic range transimpedance-based CMOS ASIC for tuning fork microgyroscopes," IEEE Journal of Solid-State Circuits 42, 1790-1802 (2007).

[6] R. Wang, P. Cheng, F. Xie, D. Young, Z. Hao, "A multiple-beam tuning fork gyroscope with high quality factors," Sensors and Actuation A 166, 22-33 (2011).

[7] K. Maenaka, T. Shiozawa, "A study of silicon angular rate sensors using anisotropic etching technology," Sensors and Actuators A: Physical 43, 72-77 (1993).

[8] J. S. Burdess, "The dynamics of a thin piezoelectric cylinder gyroscope," Proceedings of the Institution of Mechanical Engineers, Part C: Journal of Mechanical Engineering Science 200, 271-280 (1986).

[9] D. D. Lynch, "Hemispherical Resonator Gyro," Inertial Technology for the Future, IEEE Transactions on Aerospace Electronic Systems, AES-20, 414-444 (1984).

[10] A. D. Meyer, D. M. Rozelle, "Milli-HRG inertial navigation system," Position Location and Navigation Symposium (IEEE, 2012), pp. 24-29.

[11] Y. Kagawa, N. Wakatsuki, T. Tsuchiya, Y. Terada, "A tubular piezoelectric vibrator gyroscope," IEEE Journal of Sensors, 6, 325-330 (2006).

[12] W. C. Tang, T.-C. H. Nguyen, M. W. Judy, R. T. Howe, "Electrostatic-comb drive of lateral polysilicon resonators," Sensors and Actuators A: Physical 21, 328-331 (1990).

[13] R. Camacho, J. Chan, M. Eichenfield, and O. Painter, "Characterization of radiation pressure and thermal effects in a nanoscale optomechanical cavity," Optics Express 17, 15726-15735 (2009).

[14] A. G. Krause, M. Winger, T. D. Blasius, Q. Lin, O. Painter, "A high-resolution microchip optomechanical accelerometer," Nature Photonics 6, 768-772 (2012).

[15] J. D. Teufel, T. Donner, M. A. Castellanos-Beltran, J. W. Harlow, K. W. Lehnert, "Nanomechanical motion measured with an imprecision below that at the standard quantum limit," Nature Nanotechnology 4, 820-823 (2009).

[16] G. Anetsberger, E. Gavartin, O. Arcizet, Q. P. Unterreithmeier, E. M. Weig, M. L. Gorodetsky, J. P. Kotthaus, and T. J. Kippenberg, "Measuring nanomechanical motion with an imprecision below the standard quantum limit," Physical Review A 82, 061804(R) (2010).

[17] B. S. Sheard, M. B. Gray, C. M. Mow-Lowry, D. E. McClelland, S. E. Whitcomb, "Observation and characterization of an optical spring," Physical Review A 69, 051801 (2004).

[18] Q. Lin, J. Rosenberg, X. Jiang, K. J. Vahala, O. Painter, "Mechanical oscillation and cooling actuated by the optical gradient force," Physical Review Letters 103, 103601 (2009).

[19] A. Sharma, M. F. Zaman, F. Ayazi, "A sub-0.2/hr bias drift micromechanical silicon gyroscope with automatic CMOS mode-matching," IEEE Journal of Solid-State Circuits 44, 1593-1608 (2009).

[20] T. Yamamoto, M. Notomi, H. Taniyama, E. Kuramochi, Y. Yoshikawa, Y. Torii, and T. Kuga, "Design of a high-Q air-slot cavity based on a width-modulated line-defect in a photonic crystal slab," Optics Express 16, 13809-13817 (2008).

[21] P. Pai, F. K. Chowdhury, H. Pourzand and M. Tabib-Azar, "Fabrication and testing of hemispherical MEMS wine-glass resonators, MEMS 13, 677-680 (2013).

What is claimed is:

1. An integrated optomechanical disk vibratory gyroscope device comprising:
  a mechanical oscillator comprising a substantially circular structure, said substantially circular structure mechanically coupled to and supported by a pillar, and mechanically isolated from a surrounding structure by a gap or slot;
  one or more actuators disposed in said surrounding structure adjacent to and electro-mechanically or opto-mechanically coupled to said mechanical oscillator across said gap or slot, each of said one or more actuators configured to excite said mechanical oscillator in a driving mode; and
  one or more optomechanical cavities disposed substantially in a plane defined by said mechanical oscillator and radially offset about said substantially circular structure from said one or more actuators, at least one component of said one or more optomechanical cavities disposed on or in said substantially circular structure, each of said at least one or more optomechanical cavities configured to measure a displacement of said mechanical oscillator in a sensing mode.

2. The integrated optomechanical disk vibratory gyroscope device of claim 1, wherein said mechanical oscillator comprises a disk structure.

3. The integrated optomechanical disk vibratory gyroscope device of claim 1, wherein said mechanical oscillator comprises a ring or wheel structure.

4. The integrated optomechanical disk vibratory gyroscope device of claim 1, wherein said mechanical oscillator comprises a hat structure.

5. The integrated optomechanical disk vibratory gyroscope device of claim 1, wherein said mechanical oscillator comprises a mushroom or wine-glass structure.

6. The integrated optomechanical disk vibratory gyroscope device of claim 1, wherein said one or more actuators comprise electrical driving electrodes.

7. The integrated optomechanical disk vibratory gyroscope device of claim 1, wherein said one or more actuators comprise optical displacement actuators.

8. The integrated optomechanical disk vibratory gyroscope device of claim 1, wherein at least one of said one or more optomechanical cavities comprises a slotted photonic-crystal cavity, a first side of each of said slotted photonic-crystal cavities mechanically coupled to said mechanical oscillator, and a second side of each of said slotted photonic-crystal cavities mechanically grounded.

9. The integrated optomechanical disk vibratory gyroscope device of claim 1, wherein at least one of said at least one or more optomechanical cavities comprises a coupled photonic-crystal nanobeam, a first beam of said coupled photonic-crystal nanobeam mechanically coupled to said mechanical oscillator, and a second beam of said coupled photonic-crystal nanobeam mechanically grounded.

10. The integrated optomechanical disk vibratory gyroscope device of claim 1, wherein at least one of said one or more optomechanical cavities further comprises optical strip waveguides, each of said optical strip waveguides comprising a bend configured to route optical signals to and from said integrated optomechanical disk vibratory gyroscope.

11. The integrated optomechanical disk vibratory gyroscope device of claim 1, wherein at least one of said one or more optomechanical cavities comprises a Fabry-Perot optomechanical cavity having a first mirror coupled to said mechanical oscillator, and a second minor mechanically grounded.

12. The integrated optomechanical disk vibratory gyroscope device of claim 11, wherein one or more optical strip waveguides are butt coupled to a short photonic-crystal waveguide.

13. The integrated optomechanical disk vibratory gyroscope device of claim 11, further comprising a grating coupler or a mode-converter configured to couple light to or from an off-chip optical fiber.

14. The integrated optomechanical disk vibratory gyroscope device of claim 1, wherein at least a selected one of: a frequency of said one or more optomechanical cavities, and a bandwidth of said one or more optomechanical cavities is tuned by use of an optical spring effect.

15. A method for operating an integrated optomechanical disk vibratory gyroscope device comprising the steps of:
providing an integrated optomechanical disk vibratory gyroscope device comprising: a mechanical oscillator comprising a substantially circular structure, said substantially circular structure mechanically coupled to and supported by a pillar, and mechanically isolated from a surrounding structure by a gap or slot, one or more actuators disposed in said surrounding structure adjacent to and electro-mechanically or opto-mechanically coupled to said mechanical oscillator across said gap or slot, each of said one or more actuators configured to excite said mechanical oscillator in a driving mode, and one or more optomechanical cavities disposed substantially in a plane defined by said mechanical oscillator and radially offset about said substantially circular structure from said one or more actuators, at least one component of said one or more optomechanical cavities disposed on or in said substantially circular structure, each of said at least one or more optomechanical cavities configured to measure a displacement of said mechanical oscillator in a sensing mode;
displacing said mechanical oscillator by an electromechanical or optomechanical stimulus applied to a displacement actuator comprising said one or more actuators; and
sensing a displacement of said mechanical oscillator responsive by a plurality of displacement sensors comprising said one or more optomechanical cavities.

16. The method of claim 15, wherein said step of displacing said mechanical oscillator comprises displacing said mechanical oscillator by an electromechanical stimulus applied by capacitively coupled electrodes driven by an electrical potential.

17. The method of claim 15, wherein said step of displacing said mechanical oscillator comprises displacing said mechanical oscillator by an optomechanical stimulus applied to said displacement actuator comprising said one or more actuators wherein an optical gradient force is generated by pumping said optomechanical cavity with an optical wave and said mechanical oscillator is driven by modulating a pump amplitude at a mechanical resonance frequency.

* * * * *